US011167840B2

(12) United States Patent
Block et al.

(10) Patent No.: US 11,167,840 B2
(45) Date of Patent: Nov. 9, 2021

(54) AIRCRAFT MAIN LANDING GEAR DRAG BRACE BACKUP FITTING ASSEMBLIES AND RELATED METHODS

(71) Applicant: The Boeing Company, Chicago, IL (US)

(72) Inventors: Samuel Lewis Block, Seattle, WA (US); Orion Parker Watson, Kirkland, WA (US); Daniel Harvey Fletcher, Lake Forest Park, WA (US); Michael Robert Rush, Edmonds, WA (US); Elizabeth Rose Benson, Lynnwood, WA (US)

(73) Assignee: The Boeing Company, Chicago, IL (US)

( * ) Notice: Subject to any disclaimer, the term of this patent is extended or adjusted under 35 U.S.C. 154(b) by 352 days.

(21) Appl. No.: 16/385,542

(22) Filed: Apr. 16, 2019

(65) Prior Publication Data

US 2020/0331595 A1    Oct. 22, 2020

(51) Int. Cl.
*B64C 25/04* (2006.01)
*B64C 3/18* (2006.01)
*B64C 25/12* (2006.01)

(52) U.S. Cl.
CPC .............. *B64C 25/04* (2013.01); *B64C 3/185* (2013.01); *B64C 3/187* (2013.01); *B64C 25/12* (2013.01)

(58) Field of Classification Search
CPC ......... B64C 25/04; B64C 3/185; B64C 3/187; B64C 25/12; B64C 2025/125; B64C 3/182; B64C 25/02
See application file for complete search history.

(56) References Cited

U.S. PATENT DOCUMENTS 2,668,030 A * 2/1954 Smith .................... B64C 25/26
                                                                                        244/102 SL
2,720,369 A * 10/1955 Detzer ................... B64C 25/26
                                                                                        244/102 SL (Continued)

FOREIGN PATENT DOCUMENTS

EP          0031601 A1    7/1981
EP          0067207 A1    7/1982

(Continued)

OTHER PUBLICATIONS

European Patent Office, "Extended European Search Report," issued in connection with Application No. 20159340.7, dated Sep. 9, 2020, 10 pages.

*Primary Examiner* — Assres H Woldemaryam
(74) *Attorney, Agent, or Firm* — Hanley, Flight & Zimmerman, LLC

(57) ABSTRACT

Aircraft main landing gear drag brace backup fitting assemblies and related methods are described herein. An example aircraft wing disclosed herein includes a rear spar having a rear side and a front side opposite the rear side, a side-of-body rib coupled to the rear spar, a rib post disposed on the front side of the rear spar, where the rib post is to couple a second rib to the rear spar, a side-of-body fitting coupled to the side-of-body rib, an intercostal member coupled between the side-of-body fitting and the rib post, and a drag brace fitting disposed on the rear side of the rear spar. The drag brace fitting is coupled to the rib post and the side-of-body fitting via a first plurality of fasteners extending through the rear spar.

20 Claims, 13 Drawing Sheets

(56) References Cited

U.S. PATENT DOCUMENTS

| | | | | |
|---|---|---|---|---|
| 4,155,522 A * | 5/1979 | Sealey | ............ | B64C 25/10 |
| | | | | 244/102 R |
| 4,392,623 A * | 7/1983 | Munsen | ............ | B64C 25/10 |
| | | | | 244/102 R |
| 4,422,604 A * | 12/1983 | Turiot | ............ | B64C 25/34 |
| | | | | 244/102 R |
| 5,022,609 A * | 6/1991 | Cranston | ............ | B64C 25/12 |
| | | | | 244/102 R |
| 6,345,787 B1 * | 2/2002 | Tighe | ............ | B64C 25/10 |
| | | | | 244/102 A |
| 6,679,452 B1 * | 1/2004 | Cottet | ............ | B64D 9/003 |
| | | | | 244/102 R |
| 7,416,156 B2 * | 8/2008 | Hinton | ............ | B64C 25/12 |
| | | | | 244/102 R |
| 7,926,761 B2 * | 4/2011 | Coupe | ............ | B29C 70/24 |
| | | | | 244/102 R |
| 9,764,826 B2 * | 9/2017 | Paddock | ............ | B64C 25/26 |
| 2010/0052343 A1 * | 3/2010 | Hallett | ............ | B66C 1/66 |
| | | | | 294/215 |
| 2015/0102169 A1 * | 4/2015 | Walker | ............ | B64C 1/26 |
| | | | | 244/131 |
| 2018/0362150 A1 * | 12/2018 | Sakota | ............ | B64C 25/12 |

FOREIGN PATENT DOCUMENTS

| | | |
|---|---|---|
| EP | 1736674 A1 | 12/2006 |
| EP | 3418188 A1 | 12/2018 |

* cited by examiner

US 11,167,840 B2

AIRCRAFT MAIN LANDING GEAR DRAG BRACE BACKUP FITTING ASSEMBLIES AND RELATED METHODS

FIELD OF THE DISCLOSURE

This disclosure relates generally to aircraft and, more particularly, to aircraft main landing gear drag brace backup fitting assemblies and related methods.

BACKGROUND

Aircraft (e.g., commercial aircraft) commonly include landing gear (e.g., left main landing gear, right main landing gear, etc.) that may be actuated to move between a deployed position and a retracted position. For example, the landing gear of an aircraft may by actuated to move from the deployed position to the retracted position subsequent to and/or in connection with a takeoff procedure of the aircraft, and from the retracted position back to the deployed position prior to and/or in connection with a landing procedure of the aircraft. The landing gear is often subjected to extremely high loads, especially when landing and braking, for instance.

SUMMARY

An example aircraft wing disclosed herein includes a rear spar having a rear side and a front side opposite the rear side, a side-of-body rib coupled to the rear spar, a rib post disposed on the front side of the rear spar, where the rib post is to couple a second rib to the rear spar, a side-of-body fitting coupled to the side-of-body rib, an intercostal member coupled between the side-of-body fitting and the rib post, and a drag brace fitting disposed on the rear side of the rear spar. The drag brace fitting is coupled to the rib post and the side-of-body fitting via a first plurality of fasteners extending through the rear spar.

An example method disclosed herein includes disposing a drag brace fitting of a main landing gear on a rear side of a rear spar in a wing of an aircraft, disposing a rib post, a side-of-body fitting, and an intercostal member on a front side of the rear spar, where the intercostal member disposed between the side-of-body fitting and the rib post, and coupling the drag brace fitting, via a first plurality of fasteners, to the rib post, the side-of-body fitting, and the intercostal member.

An example aircraft wing disclosed herein includes a rear spar having a rear side and a front side opposite the rear side, a side-of-body rib coupled to the rear spar, a rib post disposed on the front side of the rear spar, the rib post to couple a second rib to the rear spar, a fitting coupled to the side-of-body rib and the rib post, and a drag brace fitting disposed on the rear side of the rear spar. The drag brace fitting is coupled to the rib post and the fitting via a plurality of fasteners extending through the rear spar.

Figure 1:
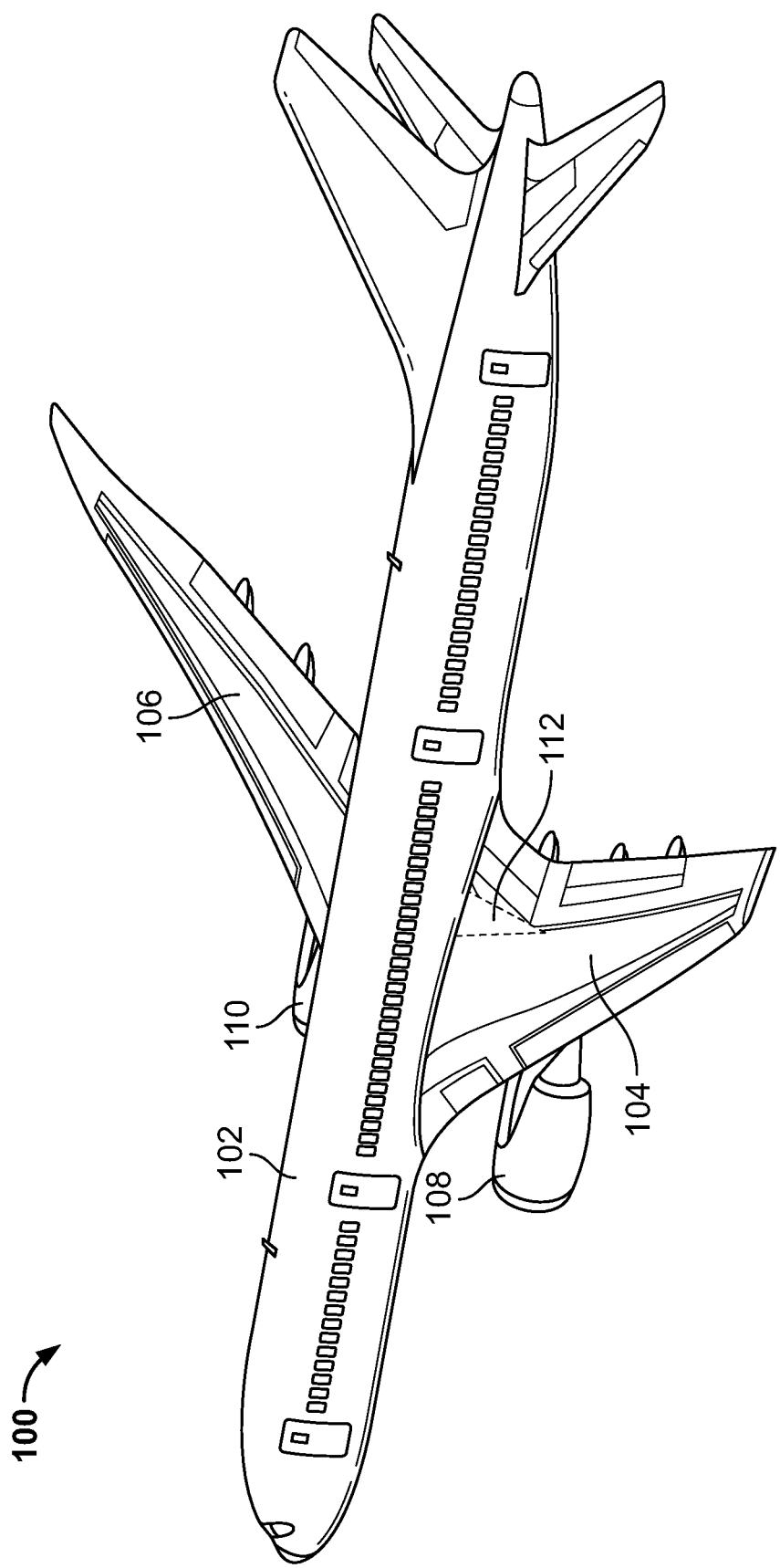
FIG. 1 illustrates an example aircraft in which the examples disclosed herein can be implemented.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located there between. Stating that any part is in contact with another part means that there is no intermediate part between the two parts.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Disclosed herein are example backup fitting assemblies for aircraft main landing gear drag brace fittings. The example backup fitting assemblies disclosed herein provide an improved load path for main landing gear drag load that reduces or eliminates out-of-plane loads on a rear spar. The example backup fitting assemblies disclosed herein are also smaller and lighter than known backup fitting structures, which results in reduced weight to the aircraft, thereby improving fuel efficiency. Also disclosed herein are related methods of installing drag brace fittings with the example backup fitting assemblies. The example backup fitting assemblies are easier and quicker to install than known backup fitting structures, which reduces overall assembly time and cost.

Aircraft (e.g., commercial aircraft) commonly include a left main landing gear that is deployed below the left wing (near the root of the left wing) and a right main landing gear that is deployed below the right wing (near the root of the right wing). Each landing gear includes a vertical support post with wheels and one or more braces that extend between the vertical support post and another structure in the wing or fuselage. Some aircraft employ a drag brace that is used to transfer drag loads to one or more other structures in the wing. For example, the drag brace is coupled between the vertical support post and a rear spar in the wing. The drag brace is coupled to a drag brace fitting that is installed on the rear side of the rear spar. (Due to design constraints, the drag brace fitting is typically required to be located on the rear spar, and precludes any attachment of the drag brace fitting directly to the skin panels, trapezoidal panel, or side-of-body rib). During landing, for example, the drag brace fitting experiences extremely high loads. It is important to control the direction of the loads transmitted by the drag brace fitting to the rear spar. The rear spar may be constructed of a composite material, such as carbon fiber. In some examples, the rear spar is constructed of carbon fiber reinforced plastic (e.g., a thermoset composite, a thermoplastic composite, and/or a metal matrix composite). With composite spars, it is important to minimize out-of-plane forces because these out-of-plane forces negatively affect the spar corners (i.e., the radii between the spar web and the spar chords) such as by inducing delamination within the spar radii.

To control the loads on the rear spar, the drag brace fitting in known aircraft is typically coupled (via a plurality of fasteners) to one or more structures on the front side of the rear spar. For instance, in some known aircraft, the drag brace fitting is coupled to a side-of-body (SOB) fitting (which is coupled to a SOB rib) and coupled to a rib post of the second rib. When large loads are exerted on the drag brace fitting, the SOB fitting and the rib post transfer the loads to the side-of-body rib and the second rib, respectively, which imparts inward bending forces on the two ribs. To reduce this inward bending, a relatively large, robust SOB fitting is required. However, using a large SOB fitting adds significant weight to the aircraft. Further, a more robust terminal fitting with additional gussets (stiffeners) is typically required to draw load away from the upper and lower spar radius, which adds weight to the aircraft. Additionally, this type of backup structure requires the wing box to be relatively tall (between the upper and lower skin) to keep the drag brace fitting and the backup structure away from the spar corners. Thus, this known backup structure is limited to aircraft wings with tall wing boxes and cannot be practically implemented in other size aircraft wings.

Other known aircraft utilize an intermediate rib structure disposed between the SOB rib and the second rib. This intermediate rib structure distributes most of the out-of-plane load into upper and lower skins by extending deep into the wing box. However, this arrangement requires the drag brace fitting to be located further outboard on the rear spar, which requires more robust gear triangle components than if the drag brace fitting were located more inboard. This arrangement also requires a spindle axis that is parallel to the rear spar, which is less efficient than a non-parallel axis arrangement because of the need for an extra downlock support fitting on the rear spar. Further, the intermediate rib structure is relatively large and robust and, thus, adds weight to the aircraft. The large and robust rib intermediate rib structure also limits the ability to integrate the backup structure into other size aircraft (e.g., aircraft having smaller wing boxes). Additionally, this known arrangement results in hidden fastener locations that are difficult to drill, install, and seal.

Disclosed herein are example backup fitting assemblies that address the drawbacks noted above. In general, the example backup fitting assemblies disclosed herein include a horizontal intercostal spanning between the SOB rib and the second rib. The intercostal creates a load path that reacts to the main landing gear drag load and limits loading in the spar corners.

An example backup fitting assembly disclosed herein includes a SOB fitting, an intercostal member, and a rib post. The SOB fitting is coupled to the SOB rib, and the rib post is coupled to the second rib. The intercostal member is disposed between and coupled to the SOB fitting and the rib post. The drag brace fitting is coupled, via one or more fasteners that extend through the rear spar, to the backup fitting assembly, including the SOB fitting, the intercostal member, and the rib post. When a high load is exerted on the drag brace fitting (e.g., a drag load from landing and/or braking), the load is transferred to the SOB fitting, the intercostal member, and the rib post. The intercostal member enables the wing box (including the rear spar, the SOB rib, and the second rib) to maintain its primary shape and provides a load path that more efficiently distributes loads into the in-plane direction of the SOB rib and the second rib. As such, the example backup fitting assembly eliminates and/or reduces out-of-plane loads on the rear spar that affect the spar corners. In some examples disclosed herein, the SOB fitting, the intercostal member, and the rib post are separate parts that are coupled together (e.g., via fasteners). In some examples disclosed herein, the intercostal may be integral to the SOB fitting and/or the rib post. In such examples, the SOB fitting, the intercostal member, and/or the rib post are constructed to be a single unitary part or component. This integral part or component provides the same primary load path as provided by the examples where the SOB fitting, the intercostal member, and the rib post are separate parts.

The example backup fitting assemblies disclosed herein are smaller and lighter than known drag brace fitting backup structures. In particular, because the example backup fitting assemblies disclosed herein utilize an intercostal member, the SOB fitting can be reduced in size and weight. As such, using the example backup assemblies reduces the overall weight of the aircraft, thereby improving fuel efficiency. Use of the example backup fitting assemblies also reduces the need for more robust terminal fittings as seen in known aircraft arrangements, which results in ability to reduce cost and weight of parts constructed of expensive materials such as titanium. The example backup fitting assemblies disclosed herein also reduce installation/assembly time. The example backup fitting assemblies disclosed herein do not utilize (but could include) blind holes that complicate assembly. As such, use of the example backup fitting assemblies reduces overall assembly time of the aircraft, thereby reducing the cost of assembling the aircraft. Further, use of the example backup fitting assemblies eliminates the need for labor intensive (i.e., beyond part fabrication nominal specification) manual inspection to detect small flaws in the spar radius areas, as typically required with known backup structures. The example backup fitting assemblies can also be used in a greater variety of aircraft because of the small, compact arrangement. As such, the example backup fitting assemblies can be used in aircraft having a smaller wing box height.

Now turning to the figures, FIG. 1 illustrates an example aircraft 100 in which the examples disclosed herein can be implemented. The aircraft 100 includes a fuselage 102, a first wing 104 (a left wing) coupled to and extending outward from the fuselage 102, and a second wing 106 (a right wing) coupled to and extending outward from the fuselage 102. In the illustrated example, the aircraft 100 includes a first engine 108 carried by the first wing 104 and a second engine 110 carried by the second wing 106. In other examples, the aircraft 100 may include only one engine or may include more than two engines, and the engines may be coupled to the first and/or second wings 104, 106 and/or another structure on the aircraft 100 (e.g., on the tail section of the fuselage 102).

The aircraft 100 includes landing gear that is used for taxiing, takeoff, and landing. The landing gear of the aircraft 100 may have many different arrangements. Typical aircraft employ an arrangement including a left main landing gear (LMLG), a right main landing gear (RMLG), and a front wheel near the nose of the fuselage 102. The LMLG is coupled to the bottom of the first wing 104 at or near the root of the first wing 104 where the first wing 104 is coupled to the fuselage 102. Similarly, the RMLG is coupled to the bottom of the second wing 106 at or near the root of the second wing 106 where the second wing 106 is coupled to the fuselage 102. The front wheel is coupled to the bottom of the fuselage 102 near the nose. The LMLG, RMLG and front wheel are movable between a deployed state and a retracted state.

The LMLG is coupled the first wing 104 and the fuselage 102 via one or more structures (e.g., spars, beams, etc.) forming a gear triangle 112. An example location of the gear triangle 112 is illustrated in FIG. 1. In some examples, the gear triangle 112 is formed by a rear spar, a gear beam, and a side of the fuselage 102, as disclosed in further detail herein. The RMLG is similarly coupled to the second wing 106 and the fuselage 102 via another gear triangle. The examples disclosed herein are described in connection with the LMLG. However, it is understood that any of the examples disclosed herein in connection with the LMLG can likewise apply to the RMLG.

Figure 2:
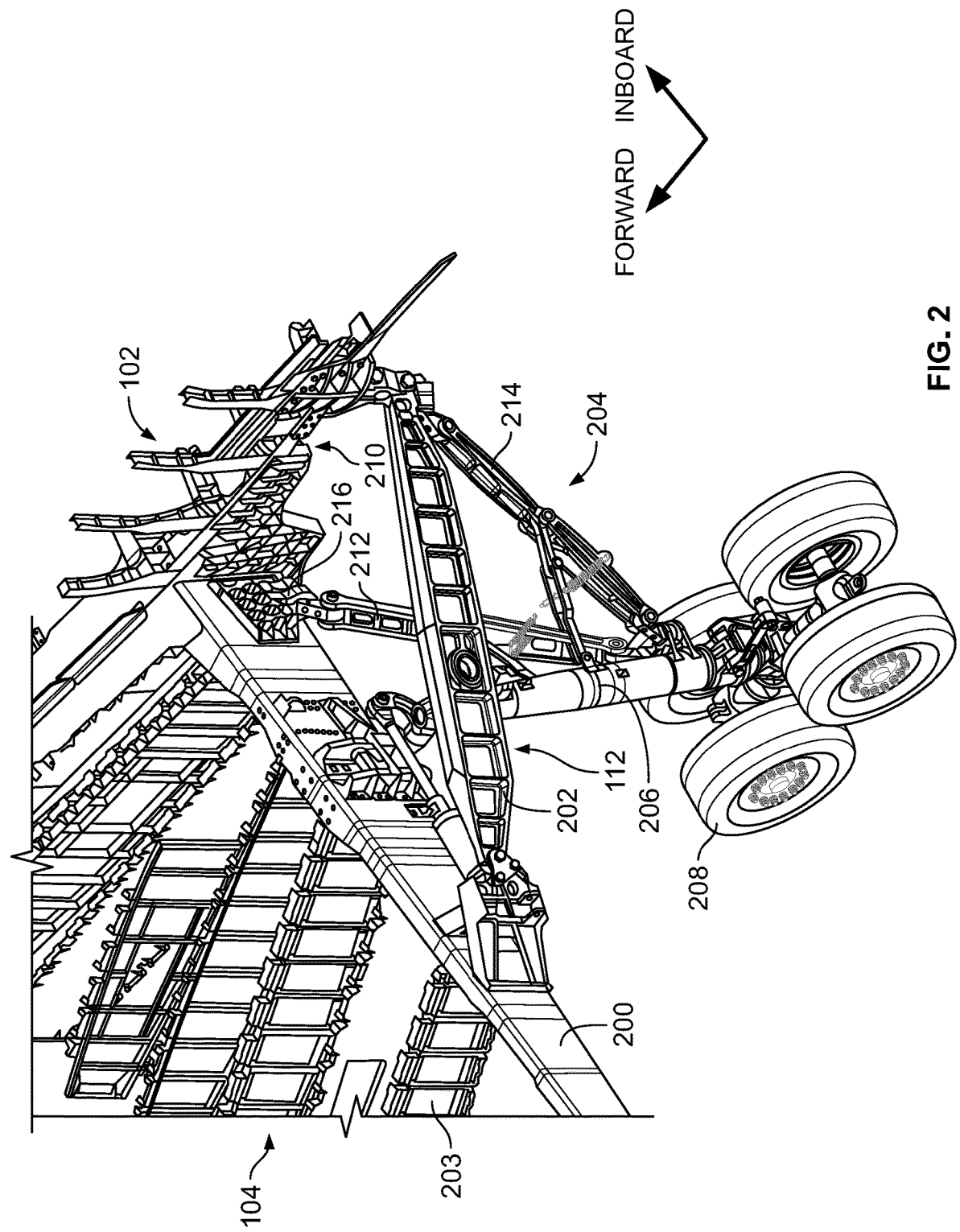
FIG. 2 illustrates an example left main landing gear employed on an example left wing of the aircraft of FIG. 1.

FIG. 2 is an enlarged view showing the gear triangle 112 from FIG. 1. In FIG. 2, the top and bottom skin (e.g., panels) and the control surfaces of the first wing 104 have been removed to expose the internal structures of the first wing 104 that form the gear triangle 112. As mentioned above, the first wing 104 includes a rear spar 200. The rear spar 200 is one of the primary load bearing members in the first wing 104. The rear spar 200 extends outward from the fuselage 102 to a tip of the first wing 104. In this example, the rear spar 200 has a C- or U-shaped cross-section or profile formed by a spar web and chords (shown in further detail in connection with FIGS. 3 and 4). In other examples, the rear spar 200 may have an L-, Tee-, or J-shaped profile. The rear spar 200 (including the web and chord(s)) may be substantially unitary part. In other examples, the chord(s) can be mechanically fastened to the web and form similar radii details. In some examples, the rear spar 200 is constructed of a composite material, such as carbon fiber (e.g., carbon fiber reinforced plastic). In other examples, the rear spar 200 may be constructed of a non-composite material, such as aluminum. The first wing 104 also has a front spar that extends outward from fuselage 102 and extends along the front (fore) side of the first wing 104. A plurality of ribs 203 (one of which is referenced in FIG. 2) are coupled between the rear spar 200 and the front spar, also attaching to the upper and lower skin panels. In the illustrated example, the first wing 104 also includes a gear beam 202. The gear beam 202 is coupled between the rear spar 200 and the fuselage 102.

As can be seen from FIG. 2, the gear triangle 112 is formed by three main structures including (1) the gear beam 202, (2) the portion of the rear spar 200 between the fuselage 102 and the gear beam 202, and (3) the portion of the fuselage 102 between the rear spar 200 and the gear beam 202. Also shown in FIG. 2 is an example LMLG 204 (sometimes referred to as a landing gear assembly). The LMLG 204 is coupled to the gear triangle 112. The LMLG 204 is movable between a deployed state (as shown in FIG. 2) and a retracted or stowed state. The LMLG 204 includes a post 206 (sometimes referred to as a shock strut, an outer cylinder, and/or oleo) and one or more wheels 208 coupled to the post 206. In the illustrated example, the LMLG 204 includes four wheels 208 (one of which is referenced in FIG. 2). However, in other examples the LMLG 204 can include more or fewer wheels (e.g., one wheel, two wheels, three wheels, five wheels, etc.). The post 206 is pivotably coupled to the rear spar 200 and the gear beam 202 (e.g., via trunnions). In the deployed state, as shown in FIG. 2, the post 206 is oriented substantially vertically such that the wheels 208 are located beneath the aircraft 100. To retract the LMLG 204 (e.g., after take-off), the post 206 is rotated upward toward the fuselage 102, which move the wheels 208 in a well 210 formed in the bottom of the fuselage 102.

In addition to experiencing significant vertical loads when the aircraft 100 is landing or taking off, the post 206 is also exposed to significant horizontal loads (e.g., side-to-side loads, rearward (drag) loads, forward loads, etc.). To transfer some of these horizontal loads away from the post 206, the LMLG 204 includes a drag brace 212 (a first brace) and a side brace 214 (a second brace). The drag brace 212 is coupled between the post 206 and the rear spar 200 (near the fuselage 102). The side brace 214 is coupled between the post 206 and the gear beam 202 (near the fuselage 102). The drag brace 212 and the side brace 214 can each include two or more links (struts) that enable the drag brace 212 and the side brace 214, respectively, to fold when the LMLG 204 is retracted. In the illustrated example, the drag brace 212 is coupled to the rear spar 200 via a drag brace fitting 216, which is coupled to and in contact with the rear spar 200.

Figure 3:
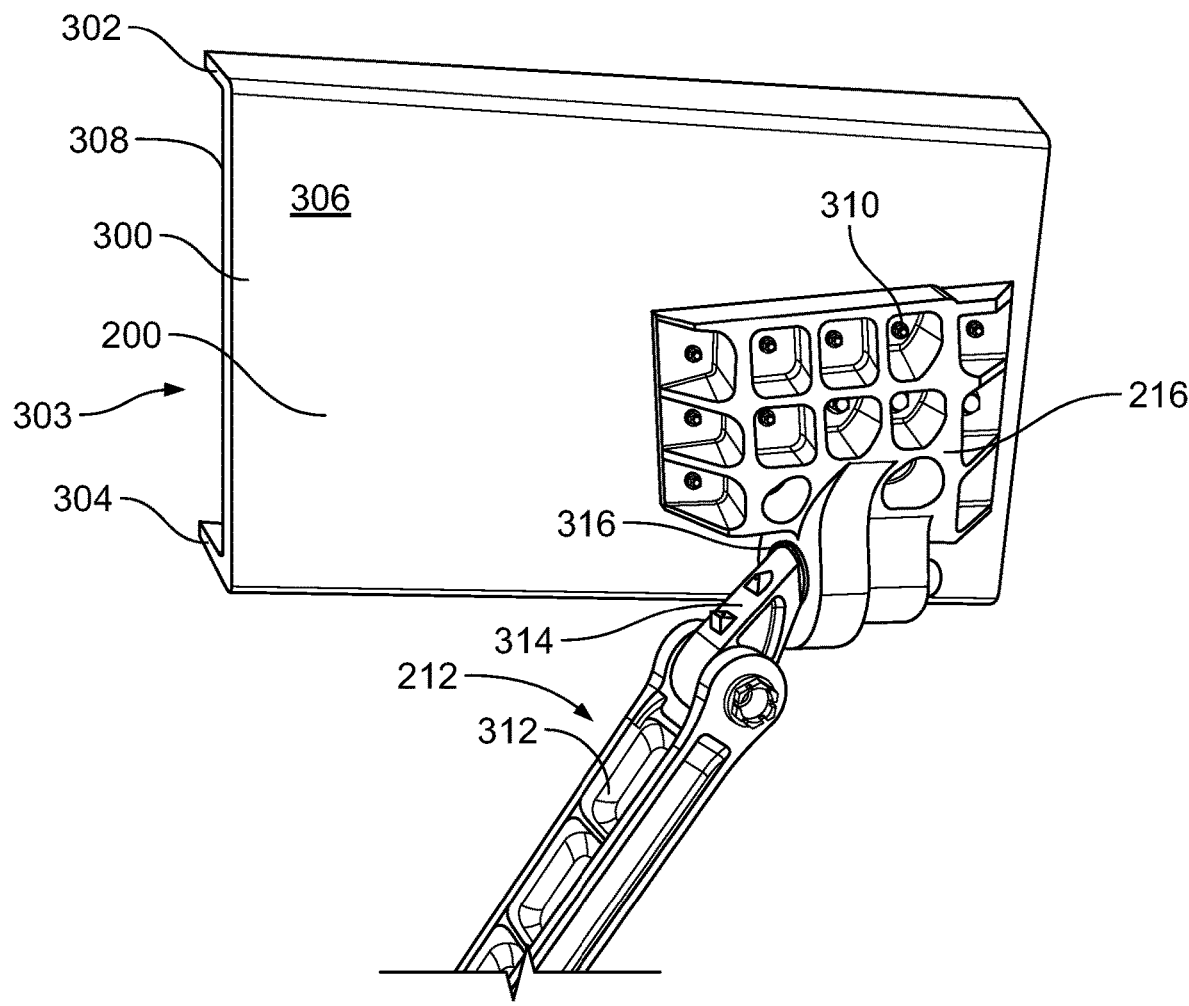
FIG. 3 is an enlarged view of an example drag brace fitting of the example left main landing gear of FIG. 2.

FIG. 3 shows the drag brace fitting 216 on the rear spar 200. The drag brace fitting 216 is coupled to a rear (aft) side of the rear spar 200. The rear spar 200 has been cross-sectioned in FIG. 3 to illustrate the radius detail. In this example, the rear spar 200 includes a web 300, an upper chord 302, and a chord flange 304. The upper and lower chords 302, 304 (sometimes referred to as flanges or caps) extend forward from the web 300 to define a cavity 303 facing the forward direction. Therefore, in this example, the rear spar 200 has a C- or U-shaped chord profile. However, in other examples, the rear spar 200 may have other shaped chord profiles, such as L-, Tee-, or J-shaped chord profiles. The rear spar 200 may be constructed of one part or multiple parts (e.g., a built-up web and chord assembly). The rear spar 200 has a rear side 306 (a first side, an aft side) and a front side 308 (a second side, a forward side) opposite the rear side 306. The drag brace fitting 216 is disposed on and coupled to the rear side 306 of the rear spar 200. In this example, the drag brace fitting 216 is in direct contact with the rear side 306 of the rear spar 200. In other examples, one or more intermediate structures (e.g., a gasket, a seal, a spacer, etc.) may be disposed between the drag brace fitting 216 and the rear spar 200. In the illustrated example, the drag brace fitting 216 is coupled to the rear spar 200 via a plurality of fasteners 310 (e.g., bolts, screws, etc.) (one of which is referenced in FIG. 3). While in the illustrated example multiple fasteners 310 are used, it is understood that any number of fasteners may be used (e.g., one fastener, two fasteners, three fasteners, etc.). The fasteners 310 couple the drag brace fitting 216 to an example backup fitting assembly disposed on the front side 308 of the rear spar 200, as disclosed in further detail herein.

The drag brace 212 is pivotably coupled to the drag brace fitting 216. The drag brace 212 includes an upper strut 312 and a spindle 314. The upper strut 312 may be pivotably coupled to a lower strut. The upper strut 312 is pivotably coupled to the spindle 314 (e.g., via a pin and bushing). The spindle 314 is pivotably coupled to the drag brace fitting 216 via a lug 316 of the drag brace fitting 216.

The drag brace 212 transfers loads to the drag brace fitting 216 from the post 206 (FIG. 2) that are experienced during landing, take-off, taxi, etc. These loads may be relatively high. For example, during landing and/or braking, a significant rearward drag load is exerted on the wheels 208 (FIG. 2) and the post 206 (FIG. 2). This rearward load creates a large tensile load in the drag brace 212. This load is transferred to the drag brace fitting 216 on the rear spar 200. The load on the drag brace fitting 216 is in the direction (longitudinal axis) of the drag brace 212.

Figure 4:
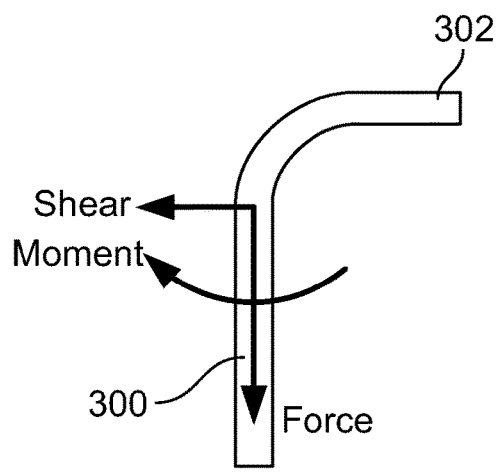
FIG. 4 illustrates forces that may be exhibited on a rear spar by a drag brace fitting.

It is important to control the directional load on the rear spar 200. In particular, it is desired to only impart loads/forces on the rear spar 200 that are in plane with the rear spar 200 (i.e., aligned with the plane of the web 300), especially in instances where the rear spar 200 is constructed of a composite material. Out-of-plane forces on the rear spar 200 can cause undesired loading at or near radii of the web 300 and the upper and lower chords 302, 304. The radii of composite material spars (e.g., carbon fiber reinforced plastic, whether thermoset, thermoplastic or metal matrix composite) are more susceptible to degradation upon high loading in this area. FIG. 4 shows a side view of the spar corner or radius formed between the web 300 and the upper chord 302. Composite spars are designed to and capable of withstanding significant in-plane forces. However, with composite spars, it is desired to reduce transverse shear load and bending moments (i.e., out-of-plane loads) at and near the spar corner or radius. These out-of-plane loads can cause interlaminar stresses that creates a delaminating effect that reduces the structural integrity of the composite material.

Therefore, the drag brace fitting 216 is coupled, through the rear spar 200, to a backup fitting assembly on the front side 308 of the rear spar 200. The connection between the drag brace fitting 216 and the backup fitting assembly is configured to transfer the out-of-plane loads experienced by the drag brace fitting 216 to other structure(s) than the rear spar 200, such as one or more ribs in the first wing 104 (FIG. 2).

Figure 5A:
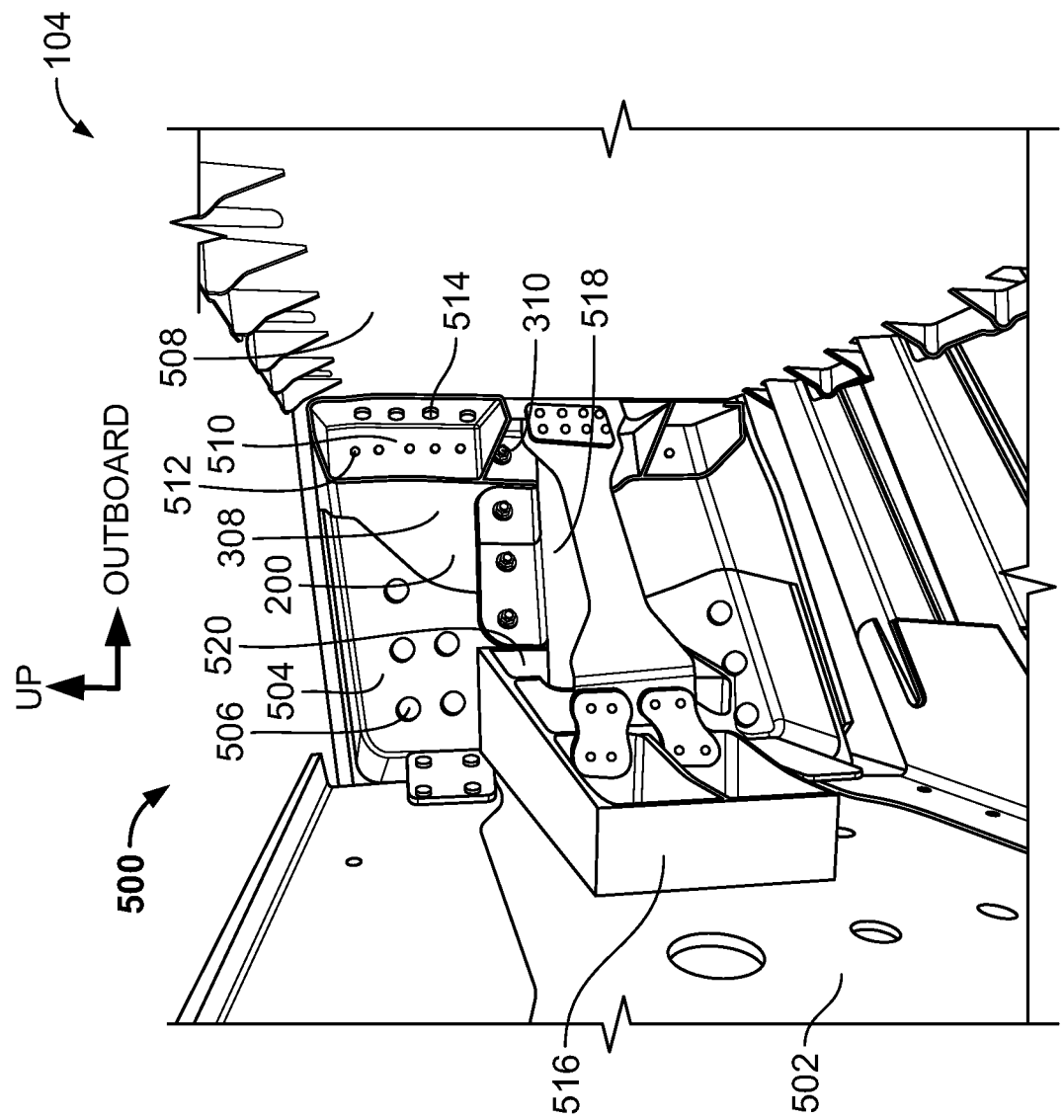
FIGS. 5A and 5B are perspective views from inside of the left wing of the aircraft of FIG. 2 showing an example backup fitting assembly that may be used to couple the example drag brace fitting of FIG. 3 to a rear spar.
Figure 5B:
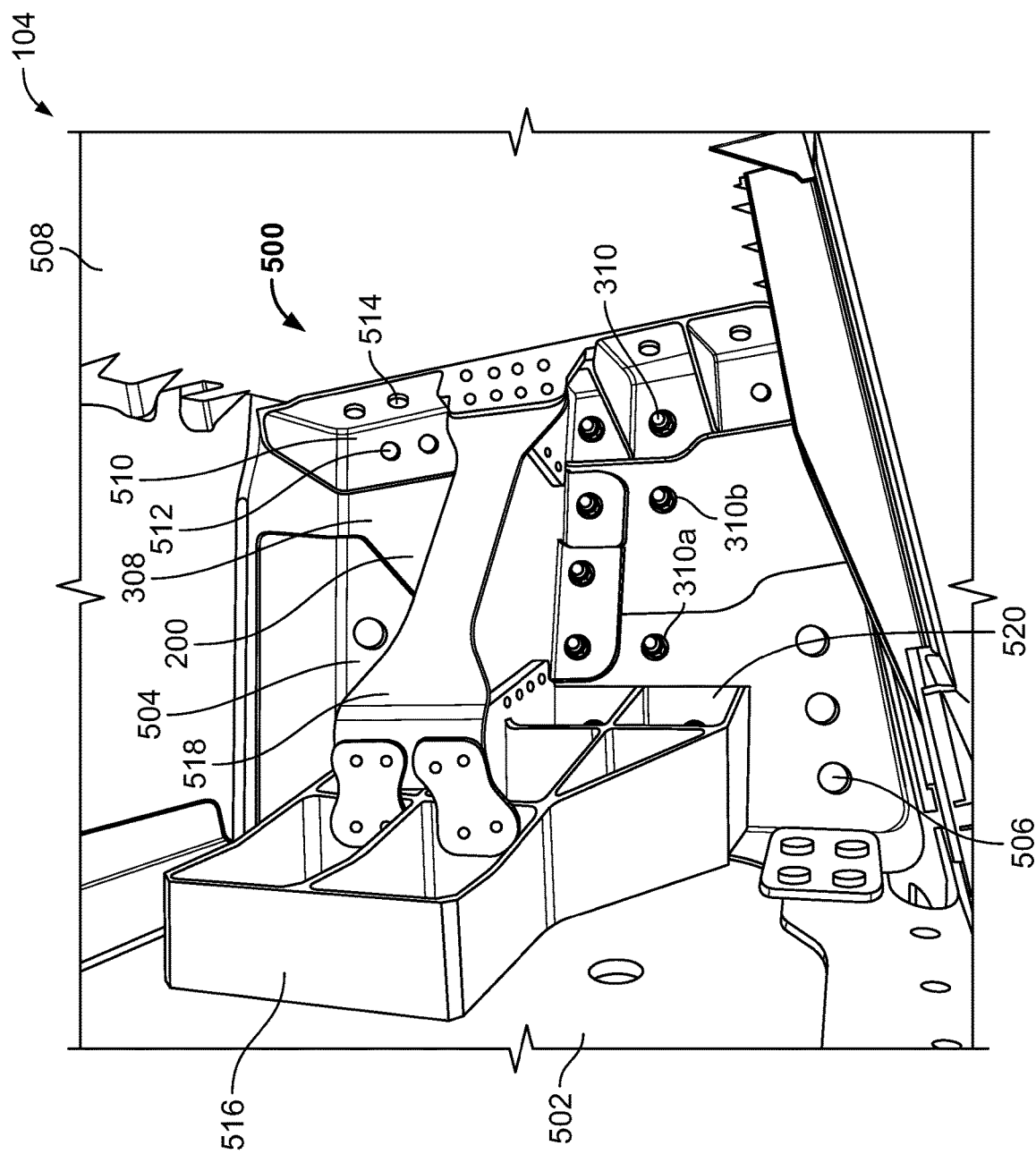

FIGS. 5A and 5B illustrate an example backup fitting assembly 500 constructed in accordance with the teachings of this disclosure. The example backup fitting assembly 500 is used to couple the drag brace fitting 216 (FIG. 3) to one or more ribs of the first wing 104, such that out-of-plane loading bypasses the rear spar 200 and is instead loaded into the ribs of the first wing 104. FIGS. 5A and 5B are views taken from inside of the first wing 104 looking aft at the front side 308 of the rear spar 200 (which is opposite the rear side 306 of the spar in FIG. 3). In FIGS. 5A and 5B, the top skin of the first wing 104 has been removed for clarity.

As shown in FIGS. 5A and 5B, the first wing 104 includes side-of-body (SOB) rib 502. The SOB rib 502 is the first rib that extends along the fuselage 102 (FIGS. 1 and 2) and forms the wing root where the first wing 104 is coupled to the fuselage 102. The SOB rib 502 is also commonly referred to as the SOB web, first rib, or RIB 1. The rear spar 200 is coupled to and extends outward from (e.g., transverse to) the SOB rib 502. In the illustrated example, the SOB rib 502 and the rear spar 200 are coupled via a terminal fitting 504. The terminal fitting 504 forms a corner fitting, attachment, or mount that couples the SOB rib 502 and the rear spar 200. The terminal fitting 504 may be coupled to the SOB rib 502 and the rear spar 200 via a plurality of fasteners 506 (e.g., bolts, screws, etc.) (one of which is referenced in each of FIGS. 5A and 5B). Any number of the fasteners 506 may be used (e.g., one fastener, two fasteners, three fasteners, etc.).

In the illustrated example, the first wing 104 also includes a second rib 508 (also referred to as RIB 2). The second rib 508 is the rib adjacent to and outboard of the SOB rib 502. The second rib 508 may be parallel to or substantially parallel to the SOB rib 502. The second rib 508 is coupled to and extends forward from the rear spar 200 (e.g., between the rear spar 200 and a front spar). In the illustrated example, the second rib 508 is coupled to the rear spar 200 via a rib post 510. The rib post 510 is coupled to and in contact with the front side 308 of the rear spar 200. In the illustrated example, the rib post 510 is coupled to the rear spar 200 via a plurality of fasteners 512 (e.g., bolts, screws, etc.) (one of which is referenced in each of FIGS. 5A and 5B). Further, the second rib 508 may be coupled to the rib post 510 via a plurality of fasteners 514 (e.g., bolts, screws, etc.) (one of which is reference in each of FIGS. 5A and 5B). Any number of the fasteners 512, 514 may be used (e.g., one fastener, two fasteners, three fasteners, etc.).

The first wing 104 includes a plurality of additional ribs (e.g., the ribs 203 of FIG. 2) that are similarly coupled between the rear spar 200 and the front spar. Each rib is spaced apart from the two adjacent ribs. Each of the ribs can be coupled to the rear spar 200 via a respective rib post, similar to the rib post 510. In some examples, aircraft fuel is stored in the first wing 104. For example, fuel may be stored in the cavity defined between the rear spar 200, the front spar, the SOB rib 502, a rib near the outboard side of the first wing 104 (e.g., RIB 6), and the top and bottom skin (panels). The ribs between the SOB rib 502 and the rib near the outboard side of the first wing 104 may have openings, such that each of the cavities between each of the ribs is fluidly connected. Aircraft fuel may be stored in the areas between each of the ribs.

The example backup fitting assembly 500 includes one or more structures used to couple the drag brace fitting 216 to the rear spar 200 and configured to transfer at least some of the load to structures of the first wing 104 other than the rear spar 200. In this example, the example backup fitting assembly 500 includes the rib post 510, a SOB drag brace backup fitting 516 (referred to herein as the SOB fitting 516), and an intercostal member 518 disposed between the rib post 510 and the SOB fitting 516.

In the illustrated example, the SOB fitting 516 is coupled to the SOB rib 502. As shown in FIGS. 5A and 5B, the SOB fitting 516 extends forward from the rear spar 200 along the SOB rib 502. The SOB fitting 516 may be coupled to the SOB rib 502 via one or more fasteners (example fasteners are shown in more detail in connection with FIG. 7). In the illustrated example, a portion of the SOB fitting 516 is in contact with and coupled to the SOB rib 502 and another portion of the SOB fitting 516 is in contact with the terminal fitting 504 and coupled to the SOB rib 502 through the terminal fitting 504. The SOB fitting 516 is also coupled to the drag brace fitting 216 (FIGS. 2 and 3) through the rear spar 200 and the terminal fitting 504. In particular, the terminal fitting 504 is disposed between the rear spar 200 and the SOB fitting 516. A rear web 520 of the SOB fitting 516 is in contact with the terminal fitting 504. One or more of the fasteners 310 extend through the drag brace fitting 216 (FIGS. 2 and 3), the rear spar 200, the terminal fitting 504, and the rear web 520 of the SOB fitting 516.

The drag brace fitting 216 (FIGS. 2 and 3) is also coupled to the rib post 510 via one or more of the fasteners 310. In particular, one or more of the fasteners 310 extend through the drag brace fitting 216, the rear spar 200, and the rib post 510. Therefore, the drag brace fitting 216 is coupled to the SOB fitting 516, which is coupled to and transfers forces (via the fasteners 310) to the SOB rib 502, and the drag brace fitting 216 is coupled to the rib post 510, which is coupled to and transfers forces (via the fasteners 310) to the second rib 508. As such, the drag brace fitting 216 is coupled to the SOB rib 502 and the second rib 508.

To prevent or substantially reduce out-of-plane loads in the rear spar 200 caused by the drag brace fitting 216, the backup fitting assembly 500 includes the intercostal member 518. The intercostal member 518 is disposed between and coupled to the SOB fitting 516 and the rib post 510. The intercostal member 518 may be coupled to the SOB fitting 516 and the rib post 510 via one or more fasteners. Example fasteners are disclosed in further detail in conjunction with FIGS. 8 and 9. Additionally, in some examples, the drag brace fitting 216 is coupled to the intercostal member 518 via one or more of the fasteners 310. In such an example, the fasteners 310 extend through the drag brace fitting 216, the rear spar 200, and the intercostal member 518. Thus, in some examples, the drag brace fitting 216 is coupled, via the fasteners 310, to the SOB fitting 516, the intercostal member 518, and the rib post 510. In other examples, the fasteners 310 may not be coupled to the intercostal member 518.

In some examples, one or more of the fasteners 310 couple the drag brace fitting 216 (FIGS. 2 and 3) to the rear spar 200 and/or the terminal fitting, without also coupling to one of the SOB fitting 516, the intercostal member 518, and the rib post 510. For example, as shown in FIG. 5B, two of the fasteners 310 (labeled 310a and 310b) couple the drag brace fitting 216 (FIG. 2) to the rear spar 200 without extending through any of the parts of the backup fitting assembly 500. In some examples, as shown in further detail herein, a portion of the terminal fitting 504 is disposed between a portion of the intercostal member 518 and the rear spar 200. Therefore, a portion of the intercostal member 518 is in contact with the terminal fitting 504 and another portion of the intercostal member 518 is in contact with the rear spar 200. In other examples, the intercostal member 518 may be located such that the terminal fitting 504 is disposed entirely between the intercostal member 518 and the rear spar 200 and none of the intercostal member 518 is in contact with the rear spar 200. In still other examples, the intercostal member 518 may be located such that the intercostal member 518 is in contact with the rear spar 200 and none of the intercostal member 518 is in contact with the terminal fitting 504.

Figure 6:
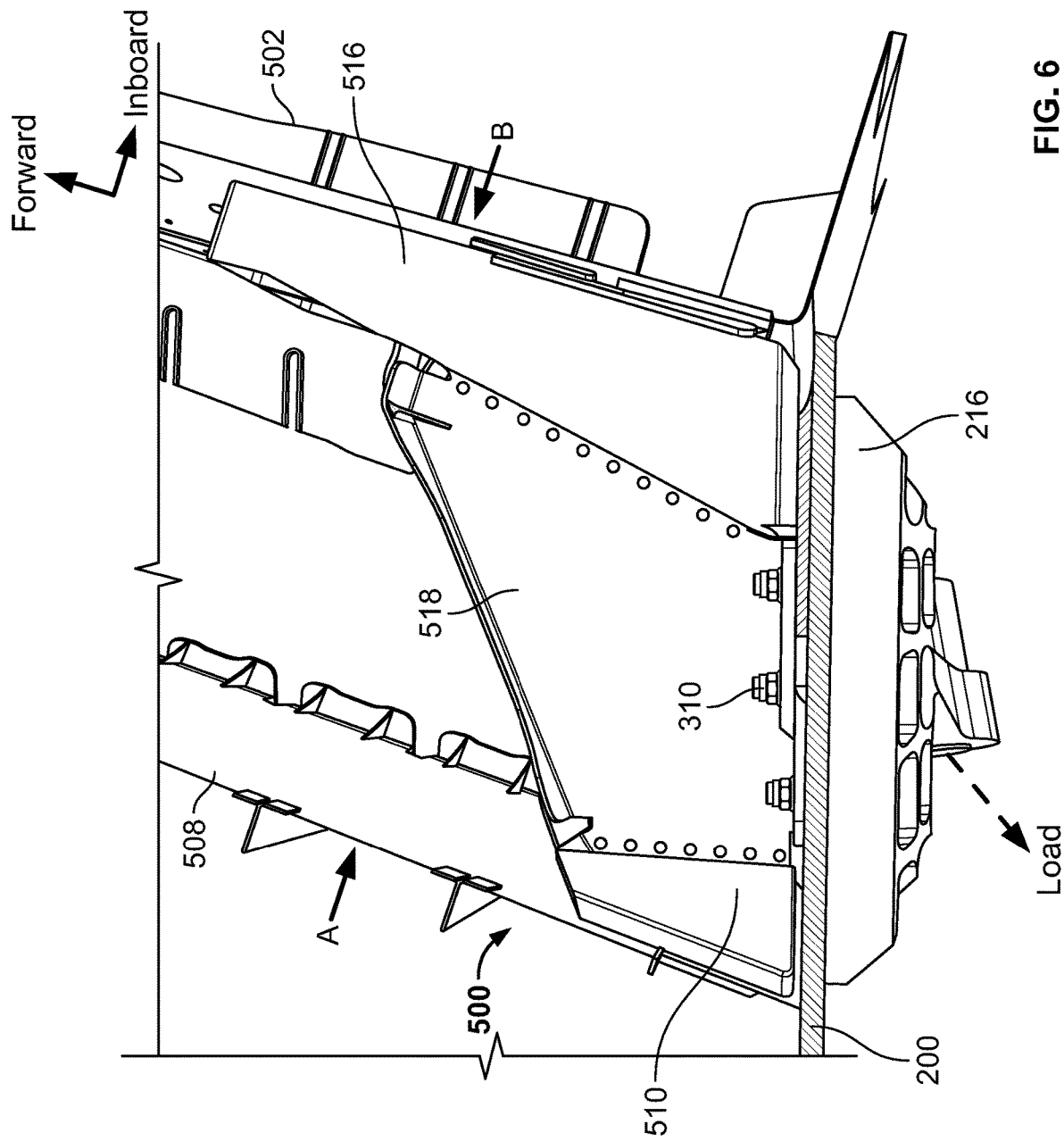
FIG. 6 is a cross-sectional view of the rear spar showing the connection between the example drag brace fitting of FIG. 3 and example backup fitting assembly of FIGS. 5A and 5B.

FIG. 6 is a cross-sectional view of the rear spar 200 looking downward on the drag brace fitting 216 and the backup fitting assembly 500. As illustrated in FIG. 6, the drag brace fitting 216 is coupled to the backup fitting assembly 500 via the one or more of the fasteners 310 (one of which is referenced in FIG. 6) extending through the rear spar 200. The load line in FIG. 6 represents the direction of the load transferred by the drag brace 212 (FIGS. 2 and 3) to the drag brace fitting 216. This load may be representative of a load experienced during landing and/or braking, for example. The component of the load normal to the web 300 (FIG. 3) is transferred, via tension in the fasteners 310, to the backup fitting assembly 500, including the SOB fitting 516, the intercostal member 518, and the rib post 510. In known aircraft, which do not include the intercostal member 518, this interface causes significant out-of-plane loads on the second rib 508 and the SOB rib 502 (in the direction of arrows A and B). In particular, these out-of-plane loads can cause the SOB rib 502 and the second rib 508 to bend inward or toward each other. This is undesired because this inward bending results in out-of-plane loading (e.g., shear or moment forces) in the rear spar 200. The example backup fitting assembly 500 of the present disclosure prevents and/or significantly reduces this out-of-plane loading on the rear spar 200. The intercostal member 518 forces the SOB rib 502, the second rib 508, and the rear spar 200 to maintain their primary shape when a significant load is applied to the rear spar 200 during landing, taxiing, etc. The intercostal member 518 provides a load path that directs the loads normal to the web 300 (FIG. 3) into the in-plane, web direction of the SOB rib 502 and the second rib 508 (which is a more effective load path), thereby preventing or substantially reducing the inward bending of the SOB rib 502 and the second rib 508. As such, the intercostal member 518 significantly reduces or eliminates out-of-plane loads imparted on the rear spar 200 by such inward bending of the ribs 502, 508.

This arrangement also enables the SOB fitting 516 to be reduced in size compared with known backup structures. In particular, known SOB fittings extend relatively far forward and have robust attachments to the spar web to help prevent SOB rib out of plane deflection. However, this adds significant weight to the aircraft wing. With the example intercostal member 518, the example SOB fitting 516 can be designed relatively shorter and smaller than known SOB fittings. As such, the example backup fitting assembly 500 reduces overall weight to the aircraft 100 (FIG. 1). Even with the addition of the intercostal member 518, the backup fitting assembly 500 is lighter than known backup fitting structures and, thus, reduces overall weight to the aircraft 100.

Figure 7:
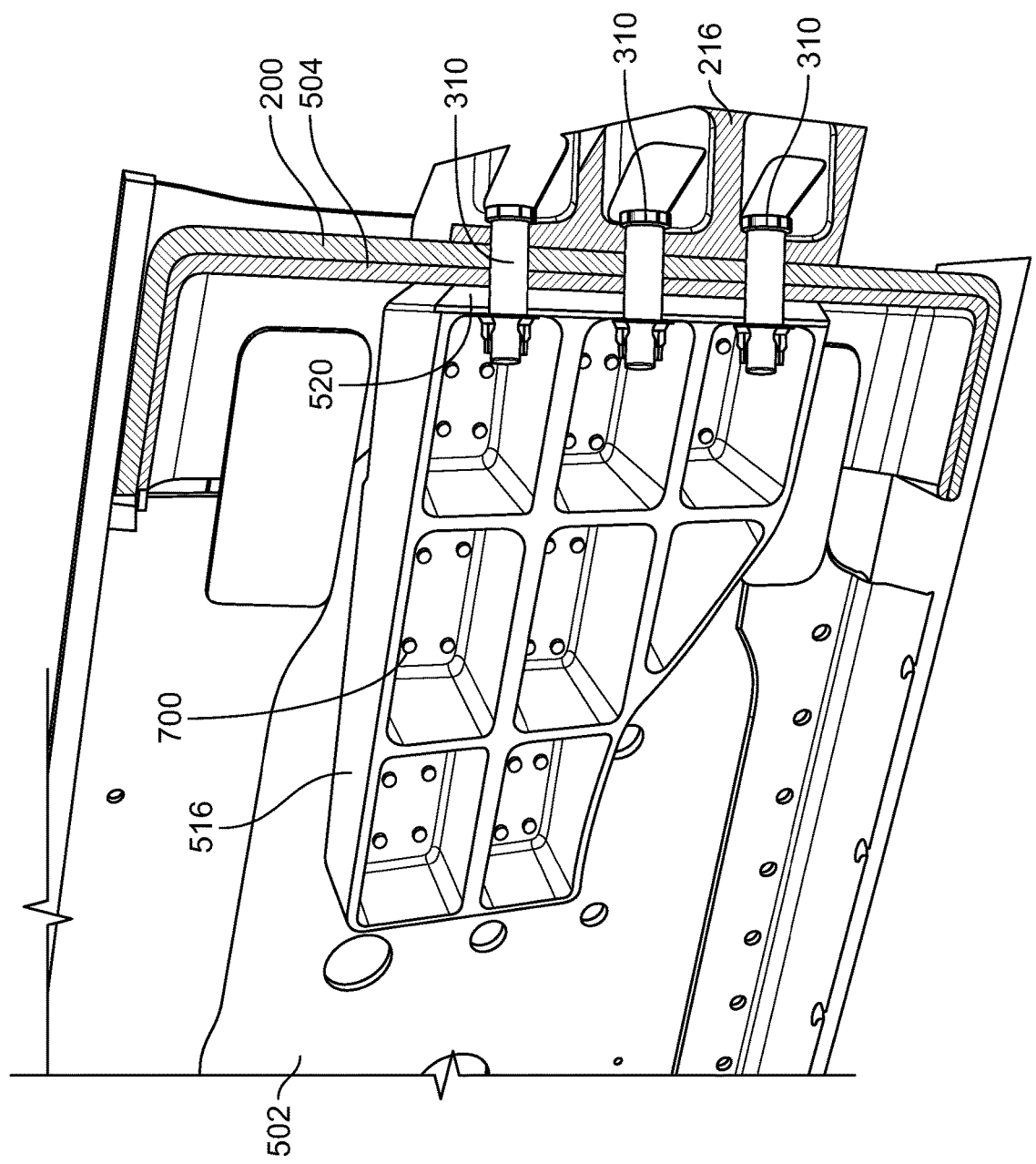
FIG. 7 is another cross-sectional view of the rear spar showing a portion of the example backup fitting assembly of FIGS. 5A and 5B.

FIG. 7 is a cross-sectional view of the rear spar 200 and the SOB fitting 516 looking toward the SOB rib 502 (inboard). As shown in FIG. 7, the fasteners 310 couple the drag brace fitting 216 to the SOB fitting 516. The fasteners 310 extend through the drag brace fitting 216, the rear spar 200, the terminal fitting 504, and the rear web 520 of the SOB fitting 516. As such, the terminal fitting 504 and the rear spar 200 are clamped between the drag brace fitting 216 and the SOB fitting 516. FIG. 7 also shows a plurality of fasteners 700 (e.g., bolts, screws, etc.) (one of which is referenced in FIG. 7) that couple the SOB fitting 516 to the SOB rib 502. Some of the fasteners 700 (e.g., the fasteners 700 closest to the rear web 520 of the SOB fitting 516) may also extend through the terminal fitting 504. Any number of the fasteners 700 may be used (e.g., one fastener, two fasteners, three fasteners, etc.).

Figure 8:
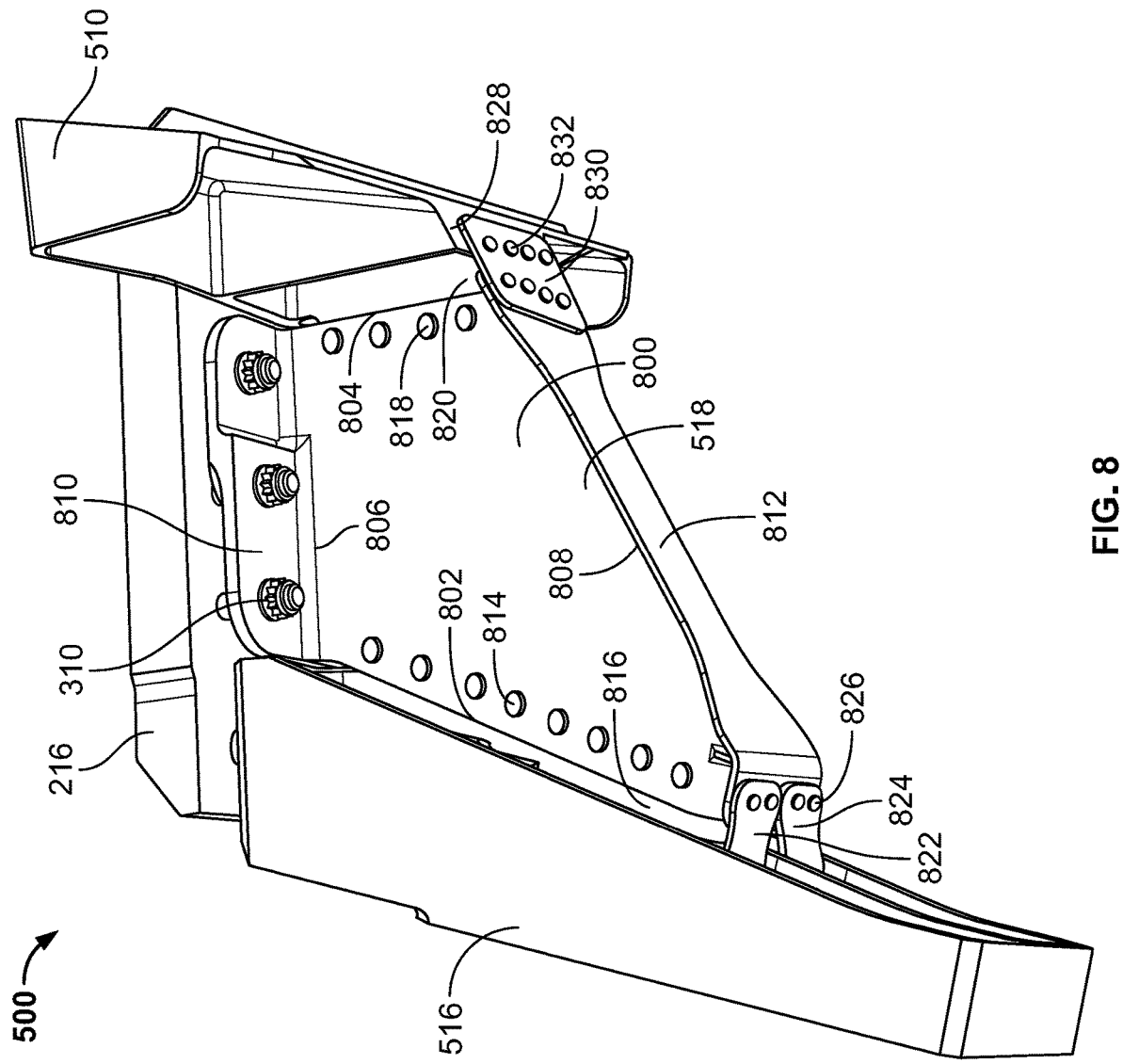
FIGS. 8 and 9 are isolated perspective views of the example drag brace fitting of FIG. 3 and the example backup fitting assembly of FIGS. 5A and 5B.
Figure 9:
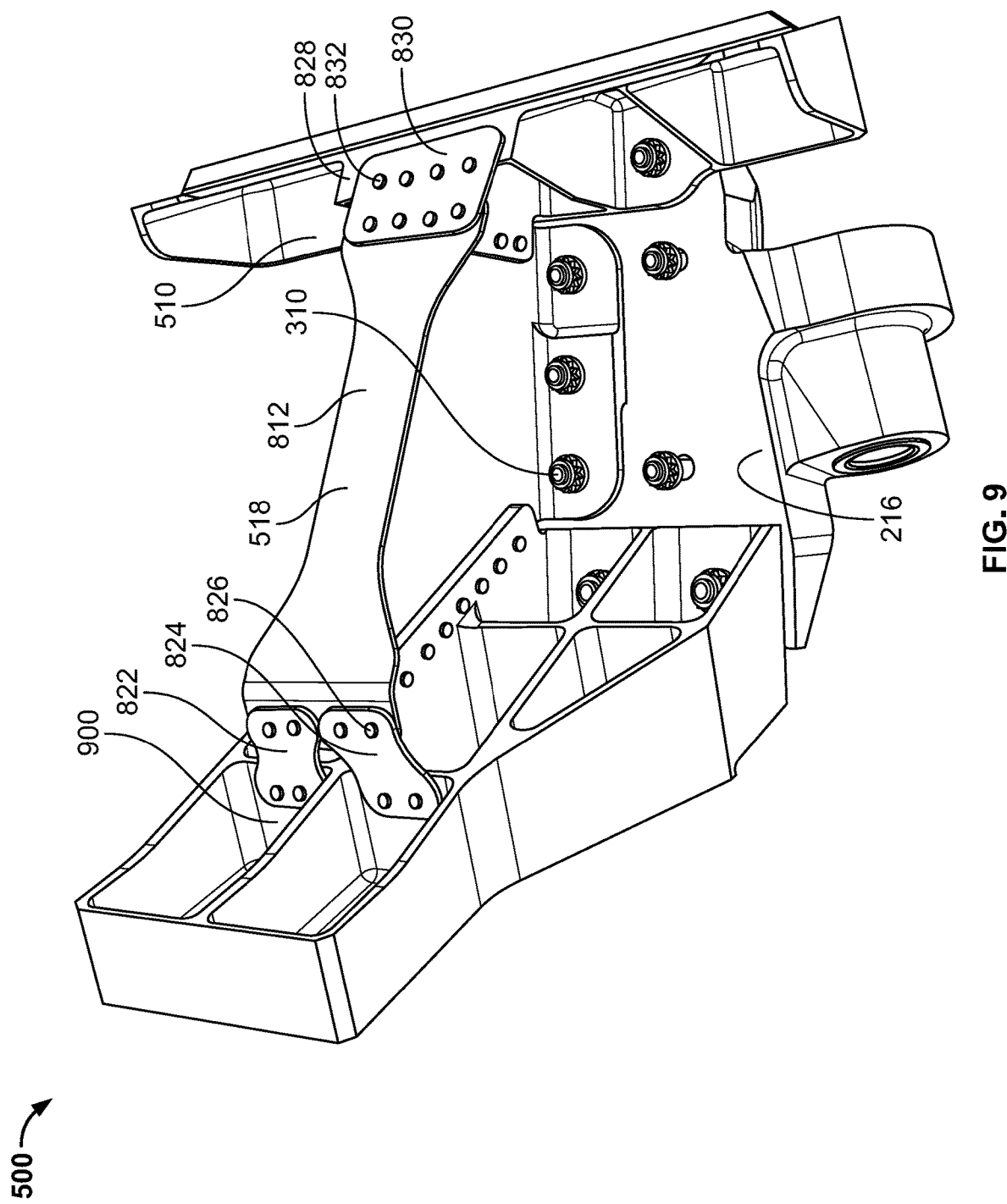

FIGS. 8 and 9 are isolated perspective views of the backup fitting assembly 500 and the drag brace fitting 216 coupled by the fasteners 310 (one of which is referenced in each of FIGS. 8 and 9). As shown in FIG. 8, the intercostal member 518 includes a web 800 (e.g., a plate). The web 800 has a first end 802 (an inboard end), a second end 804 (an outboard end) opposite the first end 802, a third end 806 (an aft end) between the first and second ends 802, 804, and a fourth end 808 (a forward end) opposite the third end 806. In the illustrated example, the intercostal member 518 also includes a flange 810 that is coupled to the third end 806 of the web 800. In some examples, the flange 810 is perpendicular to the web 800. In other examples, the flange 810 may be positioned at another angle relative to the web 800. The flange 810 includes one or more opening(s) to receive one or more of the fasteners 310. When the backup fitting assembly 500 is installed, the flange 810 is in contact with the terminal fitting 504 (FIGS. 5A and 5B) and/or the rear spar 200. The intercostal member 518 further includes a chord 812 that is coupled to the fourth end 808 of the web 800. In some examples, the chord 812 is perpendicular to the web 800. In other examples, the chord 812 may be positioned at another angle relative to the web 800. In some examples, one or more stiffeners may be provided between the web 800, the flange 810, and/or the chord 812. In some examples, the web 800, the flange 810, and the chord 812 are constructed (e.g., molded, machined) as a single unitary part or component. In other examples, the web 800, the flange 810, and/or the chord 812 may be separate parts or components that are coupled together (e.g., via fasteners).

In the illustrated example, the intercostal member 518 is in contact with and coupled between the SOB fitting 516 and the rib post 510. As shown in FIG. 8, the first end 802 of the web 800 is coupled to the SOB fitting 516. In the illustrated example, a plurality of fasteners 814 (e.g., bolts, screws, etc.) (one of which is referenced in FIG. 8) couple the web 800 to a web or stiffener 816 of the SOB fitting 516. Similarly, the second end 804 of the web 800 is coupled to the rib post 510. A plurality of fasteners 818 (e.g., bolts, screws, etc.) couple the web 800 to a web or stiffener 820 of the rib post 510. Any number of the fasteners 814, 818 may be used (e.g., one fastener, two fasteners, three fasteners, etc.).

Additionally or alternatively, one or more other sections of the intercostal member 518 can be coupled to the SOB fitting 516 and/or the rib post 510. In some examples, one or more splice plates are used to couple the intercostal member 518 to the SOB fitting 516 and/or the rib post 510. For example, as shown in FIGS. 8 and 9, the chord 812 of the intercostal member 518 is coupled to a web or stiffener 900 (FIG. 9) via a first splice plate 822 and a second splice plate 824. The first and second splice plates 822, 824 are coupled to the chord 812 and the stiffener 900 via a plurality of fasteners 826 (e.g., bolts, screws, etc.) (one of which is referenced in each of FIGS. 8 and 9). Any number of the fasteners 826 may be used (e.g., one fastener, two fasteners, three fasteners, etc.). In other examples, only one splice plate may be coupled between the chord 812 and the SOB fitting 516 or more than two splice plates may be coupled between the chord 812 and the SOB fitting 516.

In the illustrated example, the opposite end of the chord 812 is similarly coupled to a web or stiffener 828 of the rib post 510 via a third splice plate 830. The third splice plate 830 is coupled to the chord 812 and the stiffener 828 via a plurality of fasteners 832 (e.g., bolts, screws, etc.) (one of which is referenced in each of FIGS. 8 and 9). Any number of the fasteners 832 may be used (e.g., one fastener, two fasteners, three fasteners, etc.). In other examples, more than one splice plate may be coupled between the chord 812 and the rib post 510.

In the illustrated example, the first end 802 of the web 800, which is coupled to the SOB fitting 516, is longer than the second end 804 of the web 800, which is coupled to the rib post 510. This enables the rib post 510 to remain relatively shallow, while still providing an efficient load path for distributing loads between the SOB rib 502 and the second rib 508. Most of the primary load is directed on the inboard side of the drag brace fitting 216, and toward the SOB fitting 516. The rib post 510 also absorbs much of the load. The shape of the intercostal member 518 in FIG. 6 enables the use of a smaller rib post 510 as well as results in a lighter intercostal member. However, in other examples, the first and second ends 802, 804 of the web 800 maybe the same length. In some such examples, the intercostal member 518 may be coupled directly to the second rib 508 or the rib post 510 may be extended.

Figure 10:
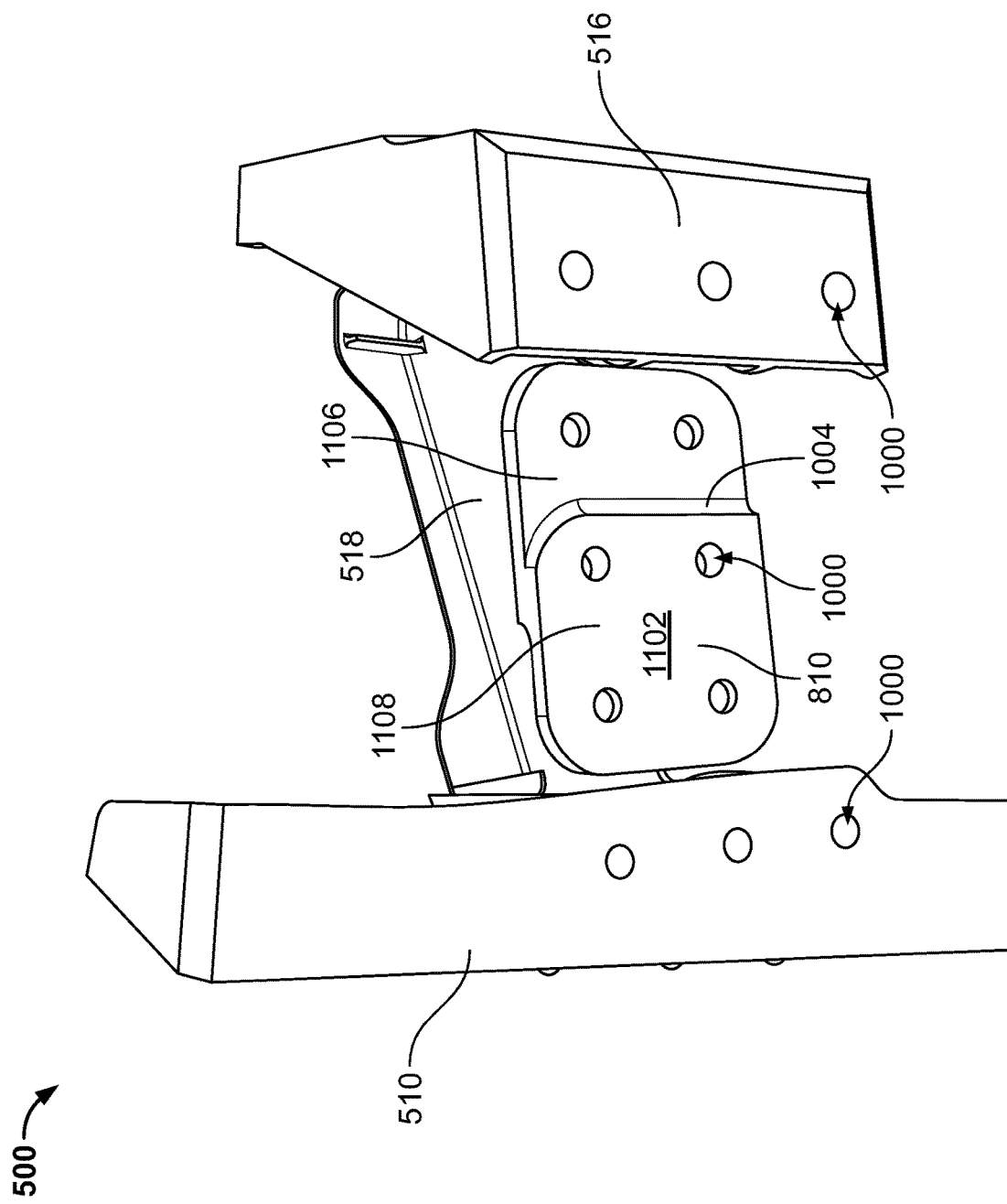
FIG. 10 is a perspective view of the example backup fitting assembly of FIGS. 5A and 5B.

FIG. 10 is perceptive view of the backup fitting assembly 500 showing the side of the backup fitting assembly 500 that couples to the rear spar 200 (FIG. 2). Openings 1000 for the fasteners 310 (FIG. 3) are formed in the rib post 510, the intercostal member 518, and the SOB fitting 516 (one opening 1000 is referenced in each of the parts). As shown in FIG. 10, an aft side 1002 of the flange 810 includes a step 1004. The step 1004 is designed to accommodate the terminal fitting 504 (FIG. 4). In particular, when the intercostal member 518 is coupled to the rear spar 200, a first portion 1106 of the flange 810 of the intercostal member 518 is separated from the rear spar 200 (FIGS. 5A and 5B) by the terminal fitting 504, and a second portion 1108 of the flange 810 of the intercostal member 518 is in contact with the rear spar 200.

Figure 11:
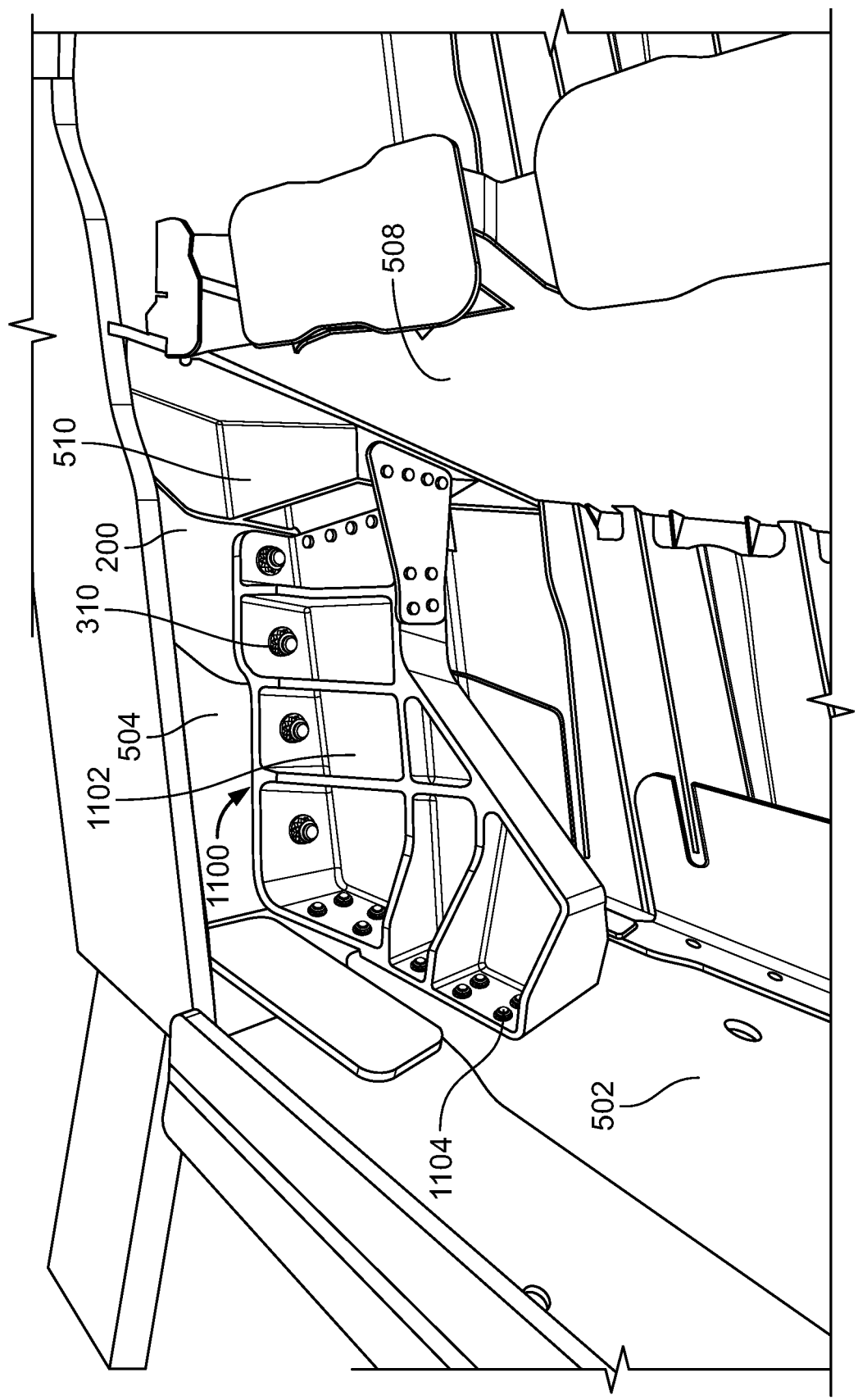
FIG. 11 is a perspective view from inside of the left wing of the aircraft of FIG. 2 showing another example backup fitting assembly that may be used to couple the drag brace fitting of FIG. 3 to the rear spar.

In the illustrated example of FIGS. 5A-10, the SOB fitting 516 and the intercostal member 518 are separate parts or components that are connected together. In other examples, the SOB fitting 516 and the intercostal member 518 can be constructed as single unitary part or component. For example, FIG. 11 illustrates another example backup fitting assembly 1100 constructed in accordance with the teachings of this disclosure. Similar to the example backup fitting assembly 500 disclosed above, the example backup fitting assembly 1100 may be used to couple the drag brace fitting 216 (FIG. 2), through the rear spar 200, to the SOB rib 502 and the second rib 508. In this example, the backup fitting assembly 1100 includes a fitting 1102 and the rib post 510. The fitting 1102 is a single unitary part that substantially corresponds to the combination of the SOB fitting 516 and the intercostal member 518 of the example backup fitting assembly 500 of FIGS. 5A-10. The fitting 1102 is coupled to the drag brace fitting 216 (FIG. 2) via the fasteners 310 (one of which is referenced in FIG. 11). The fasteners 310 extend through the rear spar 200 and/or the terminal fitting 504. The fitting 1102 is also coupled to the SOB rib 502 via a plurality of fasteners 1104 (e.g., bolts, screws, etc.) (one of which is referenced in FIG. 11). Any number of the fasteners 1104 may be used (e.g., one fastener, two fasteners, three fasteners, etc.). The backup fitting assembly 1100 functions substantially the same as the backup fitting assembly 500 disclosed above. In particular, similar to the backup fitting assembly 500 disclosed above, the backup fitting assembly 1100 creates a load path that eliminates or reduces out-of-plane loads in the rear spar 200. Because the SOB fitting 516 and intercostal member 518 are combined in the fitting 1102, the backup fitting assembly 1100 utilize fewer fasteners than the backup fitting assembly 500 disclosed above. Therefore, in some examples, using the fitting 1102 of FIG. 11 results in fewer fasteners that need to be installed, which reduces installation time and overall weight to the aircraft 100.

Figure 12:
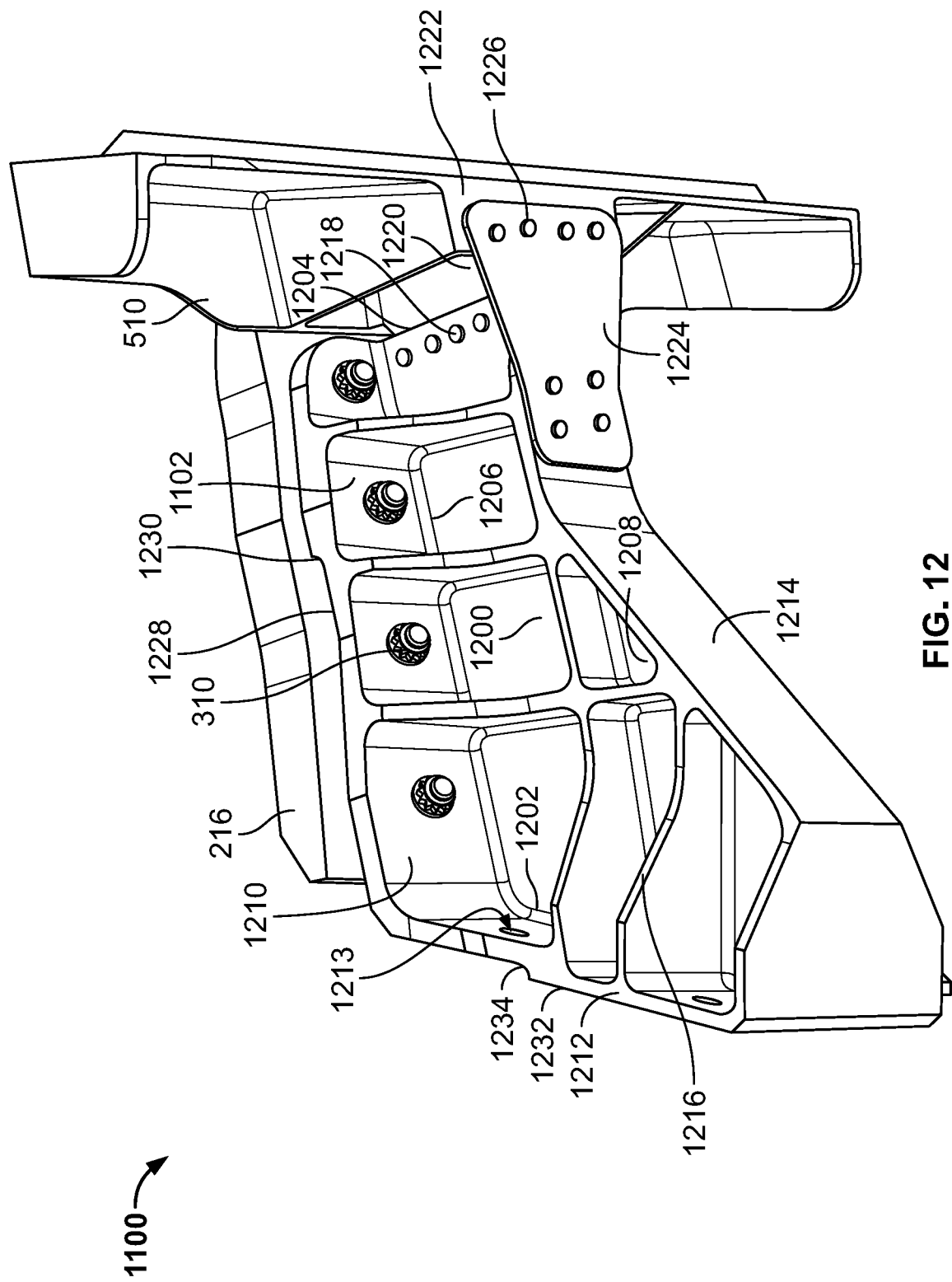
FIG. 12 is an isolated perspective view of the example drag brace fitting of FIG. 3 and the example backup fitting assembly of FIG. 11.

FIG. 12 is an isolated perspective view of the example backup fitting assembly 1100 and the drag brace fitting 216 coupled by the fasteners 310 (one of which is referenced in FIG. 12). As shown in FIG. 12, the fitting 1102 includes a first web 1200 (e.g., a plate). The first web 1200 has a first end 1202 (an inboard end), a second end 1204 (an outboard end) opposite the first end 1202, a third end 1206 (an aft end) between the first and second ends 1202, 1204, and a fourth end 1208 (a forward end) opposite the third end 1206. In the illustrated example, the fitting 1102 includes a second web 1210 that is coupled to the third end 1206 of the first web 1200. In some examples, the second web 1210 is perpendicular to the first web 1200. The second web 1210 includes one or more openings to receive one or more of the fasteners 310. The fitting 1102 also includes a third web 1212 that is coupled to the first end 1202 of the first web 1200. In some examples, the third web 1212 is perpendicular to the first web 1200. The third web 1212 includes openings 1213 (one of which is referenced in FIG. 12) to receive the fasteners 1104 that couple the fitting 1102 to the SOB rib 502 (FIG. 11). The fitting 1102 further includes a chord 1214 coupled to the fourth end 1208 of the first web 1200. In some examples, the chord 1214 is perpendicular to the first web 1200. In the illustrated example, the fitting 1102 includes a plurality of stiffeners 1216 (one of which is referenced in FIG. 12) that extend outward from the first web 1200 between the second web 120, and the third web 1212, and/or the chord 1214. The stiffeners 1216 add rigidity and stiffness to the fitting 1102. The fitting 1102 can be constructed (e.g., molded, machined) as a single unitary part or component.

In the illustrated example, the fitting 1102 is coupled to and in contact with the rib post 510. In some examples, the second end 1204 of the first web 1200 is coupled to the rib post 510. For example, a plurality of fasteners 1218 (e.g., bolts, screws, etc.) (one of which is referenced in FIG. 12) couple the first web 1200 to a web or stiffener 1220 of the rib post 510. Any number of the fasteners 1218 may be used (e.g., one fastener, two fasteners, three fasteners, etc.). Additionally or alternatively, one or more other sections of the fitting 1102 can be coupled to the rib post 510. In some examples, one or more splice plates are used to couple the fitting 1102 to the rib post 510. For example, as shown in FIG. 12, the chord 1214 of the fitting 1102 is coupled to a web or stiffener 1222 via a splice plate 1224. The splice plate 1224 is coupled to the chord 1214 and the stiffener 1222 via a plurality of fasteners 1226 (e.g., bolts, screws, etc.) (one of which is referenced in FIG. 12). Any number of the fasteners 1226 may be used (e.g., one fastener, two fasteners, three fasteners, etc.). In other examples, more than one splice plate may be coupled between the chord 1214 and the rib post 510.

A rear side 1228 of the second web 1210 includes a step 1230 to accommodate the terminal fitting 504 (FIG. 11). Similar to the intercostal member 518 of FIGS. 5A-10, when the example fitting 1102 is installed, a portion of the rear side 1228 of the second web 1210 is in contact with the terminal fitting 504, and another portion of the rear side 1228 is in contact with the rear spar 200. In other examples, the fitting 1102 may be located such that the terminal fitting 504 is disposed entirely between the fitting 1102 and the rear spar 200 and none of the fitting 1102 is in contact with the rear spar 200. In still other examples, the fitting 1102 may be located such that the fitting 1102 is in contact with the rear spar 200 and none of the fitting 1102 is in contact with the terminal fitting 504. Similarly, an inboard side 1232 of the third web 1212 includes a step 1234 to accommodate the terminal fitting 504. When the example fitting 1102 is installed, a portion of the inboard side 1232 of the third web 1212 is in contact with the terminal fitting 504, and another portion of the inboard side 1232 is in contact with the SOB rib 502. In other examples, the inboard side 1232 may be entirely in contact with the terminal fitting 504 or may be entirely in contact with the SOB rib 502. While in this example the fitting 1102 and the rib post 510 are two separate parts, in other examples, the fitting 1102 and the rib post 510 may be formed as a single unitary part or component. In such examples, the backup fitting assembly 1100 may be entirely constructed of one part or component.

Many example fasteners are disclosed herein for connecting the various parts of the first wing 104, the drag brace fitting 216, and the example backup fitting assemblies 500, 1100, such as the fasteners 310, 506, 512, 514, 700, 814, 818, 826, 832, 1104, 1218, 1226. These fasteners can be any size and/or type of fastener, including removable or reversible fasteners, such as bolts, screws, clamps, clips, etc. and/or non-reversible fasteners, such as rivets. Further, any of the example fasteners disclosed herein can be replaced by other fastening means, such as welding, adhesives, etc. Also, while many of the part(s) of the example backup fitting assemblies 500, 1100 are disclosed as being disposed on and/or in contact with other parts of the example backup fitting assemblies 500, 1100 and/or other structures of the first wing 104 (e.g., the rear spar 200, the SOB rib 502, etc.), in other examples, one or more shims or other intermediary structure(s) may be disposed between one or more of the part(s) of the example backup fitting assemblies 500, 1100 and/or one or more of the structure(s) of the first wing 104.

Figure 13:
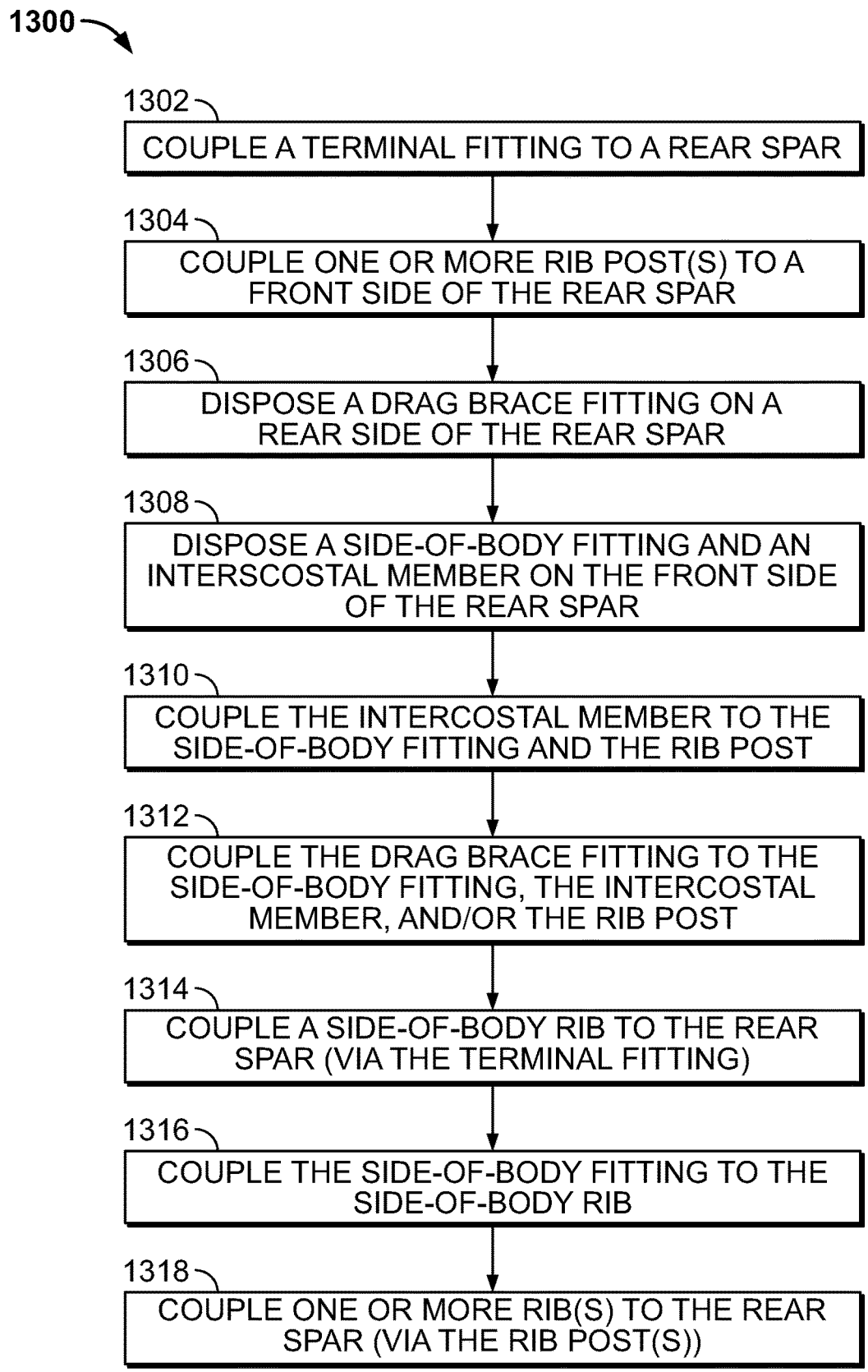
FIG. 13 is a flowchart representative of an example method of installing and/or assembling a drag brace fitting and an example backup fitting assembly during a wing assembly process.

FIG. 13 is a flowchart representative of an example method 1300 of assembling and/or installing a drag brace fitting and a backup fitting assembly, such as one of the example backup fitting assemblies 500, 1100 disclosed herein. The example method 1300 may be performed during assembly of the first wing 104 of the aircraft 100. In some examples, the wings of an aircraft are assembled first, and then the wings are coupled to the side of the fuselage. In other examples, the wings are assembled on the fuselage in various stages. The example method 1300 of FIG. 13 is described in connection with the example backup fitting assembly 500 of FIGS. 5A-10. However, it is understood that the example method 1300 can be similarly performed using the example backup fitting assembly 1100 of FIGS. 11 and 12. The elements of the example method 1300 may be rearranged, repeated, and/or omitted. The example method 1300 discloses the installation of parts/components on the rear spar 200. The rear spar 200 and the various parts and components may have pre-drilled holes for receiving fasteners. In other examples, one or more of the fastener holes may be drilled when installing the various parts and components on the rear spar 200.

At block 1302, the terminal fitting 504 is coupled to the rear spar 200 (e.g., to an inboard side of the rear spar 200). The terminal fitting 504 can be coupled to the rear spar 200 via the fasteners 506. At block 1304, one or more rib posts are coupled to the front side 308 of the rear spar 200. For example, the rib post 510 can be coupled to the front side 308 of the rear spar 200 via the fasteners 512.

At block 1306, the drag brace fitting 216 is disposed on the rear side of the rear spar 200. At block 1308, the SOB fitting 516 and the intercostal member 518 of the backup fitting assembly 500 are disposed on the front side 308 of the rear spar 200. At block 1310, the intercostal member 518 is coupled to the SOB fitting 516 and the rib post 510 (e.g., via the fasteners 814, 818, 826, 832 and the splice plates 822, 824, 830).

At block 1312, the drag brace fitting 216 is coupled to the backup fitting assembly 500. In particular, the drag brace fitting 216 is coupled, through the rear spar 200 (and the terminal fitting 504), to the SOB fitting 516, the intercostal member 518, and/or the rib post 510. In some examples, the drag brace fitting 216 is coupled to the SOB fitting 516, the intercostal member 518, and the rib post 510 via the fasteners 310, which extend through the rear spar 200 (and, in some locations, the terminal fitting 504).

In some examples, the rib post 510 is coupled to the rear spar 200 first, and then the SOB fitting 516 and the intercostal member 518 are coupled to drag brace fitting 216 and each other. In other examples, two or more of the rib post 510, the intercostal member 518, and/or the SOB fitting 516 are coupled to each other first, and then the parts are coupled to the rear spar 200 and the drag brace fitting 216 as a unit. Similarly, with the example fitting 1102 of the backup fitting assembly 1100, the fitting 1102 may be coupled to the rib post 510 first, or may be coupled to the rib post 510 after the rib post 510 is coupled to the rear spar 200.

At block 1314, the SOB rib 502 is coupled to the rear spar 200 via the terminal fitting 504 (e.g., via the fasteners 506). At block 1316, the SOB fitting 516 is coupled to the SOB rib 502 via the fasteners 700. Similarly, if the example fitting 1102 is employed, the fitting 1102 is coupled to the SOB rib 502. At block 1318, one or more ribs are coupled to the rib post(s). For example, the second rib 508 is coupled to the rib post 510. Various other parts or components can be installed and assembled to construct the first wing 104. Then, after the first wing 104 is assembled, the first wing 104 may be coupled to the side of the fuselage 102. The second wing 106 may be similarly assembled and coupled the fuselage 102. In other examples, the rear spar 200 can be coupled to the fuselage 102 first, and then various other parts or components could be coupled to the rear spar 200 to build the first wing 104.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

From the foregoing, it will be appreciated that example methods, apparatus, and articles of manufacture have been disclosed that provide improved loading paths for a rear spar caused by loading from a main landing gear drag brace fitting. The example backup fitting assemblies disclosed herein are smaller and lighter than known drag brace fitting backup structures for composite spars, which enables the example backup fitting assemblies to be used in various size aircraft wings and improves fuel efficiency of the aircraft. The example backup fitting assemblies are also easier to install, which reduces time and labor costs associated with aircraft manufacture. The example backup fitting assemblies disclosed herein can also accommodate much higher loads than known backup structures.

The following paragraphs provide various examples of the examples disclosed herein.

Example 1 includes an aircraft wing including a rear spar having a rear side and a front side opposite the rear side, a side-of-body rib coupled to the rear spar, a rib post disposed on the front side of the rear spar, the rib post is to couple a second rib to the rear spar, a side-of-body fitting coupled to the side-of-body rib, an intercostal member coupled between the side-of-body fitting and the rib post, and a drag brace fitting disposed on the rear side of the rear spar. The drag brace fitting is coupled to the rib post and the side-of-body fitting via a first plurality of fasteners extending through the rear spar.

Example 2 includes the aircraft wing of Example 1, wherein the drag brace fitting is coupled to the intercostal member via at least one of the first plurality of fasteners.

Example 3 includes the aircraft wing of Example 1 or 2, wherein the intercostal member includes a web having a first end and a second end opposite the first end. The first end of the web is coupled to the side-of-body fitting and the second end of the web is coupled to the rib post.

Example 4 includes the aircraft wing of Example 3, wherein the first end of the web is longer than the second end of the web.

Example 5 includes the aircraft wing of Example 3 or 4, wherein the web is coupled to a stiffener of the side-of-body fitting via a second plurality of fasteners, and the web is coupled to a stiffener of the rib post via a third plurality of fasteners.

Example 6 includes the aircraft wing of any of Examples 3-5, wherein the web of the intercostal member includes a third end and a fourth end opposite the third end, and wherein the intercostal member includes a flange coupled to the third end of the web and a chord coupled to the fourth end of the web.

Example 7 includes the aircraft wing of Example 6, wherein at least one of the first plurality of fasteners extends through one or more openings in the flange.

Example 8 includes the aircraft wing of Example 6 or 7, wherein the chord is coupled via one or more splice plates to the side-of-body fitting and the rib post.

Example 9 includes the aircraft wing of any of Examples 1-8, further including a terminal fitting. The rear spar and the side-of-body rib are coupled via the terminal fitting.

Example 10 includes the aircraft wing of Example 9, wherein the terminal fitting is disposed between a rear web of the side-of-body fitting and the rear spar, and wherein at least one of the first plurality of fasteners extends through the drag brace fitting, the rear spar, the terminal fitting, and the rear web of the side-of-body fitting.

Example 11 includes the aircraft wing of Example 9 or 10, wherein a first portion of the intercostal member is separated from the rear spar by the terminal fitting, and a second portion of the intercostal member is in contact with the rear spar.

Example 12 includes the aircraft wing of any of Examples 1-11, wherein the rear spar is constructed of carbon fiber reinforced plastic.

Example 13 includes a method including disposing a drag brace fitting of a main landing gear on a rear side of a rear spar in a wing of an aircraft, disposing a rib post, a side-of-body fitting, and an intercostal member on a front side of the rear spar, the intercostal member disposed between the side-of-body fitting and the rib post, and coupling the drag brace fitting, via a first plurality of fasteners, to the rib post, the side-of-body fitting, and the intercostal member.

Example 14 includes the method of Example 13, further including coupling a side-of-body rib to the rear spar and coupling the side-of-body fitting to the side-of-body rib via a second plurality of fasteners.

Example 15 includes the method of Example 14, further including coupling a second rib to the rib post.

Example 16 includes the method of any of Examples 13-15, further including coupling the intercostal member to the side-of-body fitting and the rib post.

Example 17 includes the method of Example 16, wherein coupling the intercostal member to the side-of-body fitting and the rib post includes coupling the intercostal member to the side-of-body fitting via a second plurality of fasteners and coupling the intercostal member to the rib post via a third plurality of fasteners.

Example 18 includes an aircraft wing including a rear spar having a rear side and a front side opposite the rear side, a side-of-body rib coupled to the rear spar, a rib post disposed on the front side of the rear spar, the rib post to couple a second rib to the rear spar, a fitting coupled to the side-of-body rib and the rib post, and a drag brace fitting disposed on the rear side of the rear spar. The drag brace fitting is coupled to the rib post and the fitting via a plurality of fasteners extending through the rear spar.

Example 19 includes the aircraft wing of Example 18, wherein the fitting is in contact with the side-of-body rib and the rib post.

Example 20 includes the aircraft wing of Example 19, wherein the fitting is in contact with the rear spar.

Although certain example methods, apparatus, and articles of manufacture have been disclosed herein, the scope of coverage of this patent is not limited thereto. On the contrary, this patent covers all methods, apparatus, and articles of manufacture fairly falling within the scope of the claims of this patent.

What is claimed is:

1. An aircraft wing comprising:
    a rear spar having a rear side and a front side opposite the rear side;
    a side-of-body rib coupled to the rear spar;
    a rib post disposed on the front side of the rear spar, the rib post to couple a second rib to the rear spar;
    a side-of-body fitting coupled to the side-of-body rib;
    an intercostal member coupled between the side-of-body fitting and the rib post; and
    a drag brace fitting disposed on the rear side of the rear spar, the drag brace fitting coupled to the rib post and the side-of-body fitting via a first plurality of fasteners extending through the rear spar.

2. The aircraft wing of claim 1, wherein the drag brace fitting is coupled to the intercostal member via at least one of the first plurality of fasteners.

3. The aircraft wing of claim 1, wherein the intercostal member includes a web having a first end and a second end opposite the first end, the first end of the web coupled to the side-of-body fitting and the second end of the web coupled to the rib post.

4. The aircraft wing of claim 3, wherein the first end of the web is longer than the second end of the web.

5. The aircraft wing of claim 3, wherein the web is coupled to a stiffener of the side-of-body fitting via a second plurality of fasteners, and the web is coupled to a stiffener of the rib post via a third plurality of fasteners.

6. The aircraft wing of claim 3, wherein the web of the intercostal member includes a third end and a fourth end opposite the third end, and wherein the intercostal member includes a flange coupled to the third end of the web and a chord coupled to the fourth end of the web.

7. The aircraft wing of claim 6, wherein at least one of the first plurality of fasteners extends through one or more openings in the flange.

8. The aircraft wing of claim 6, wherein the chord is coupled via one or more splice plates to the side-of-body fitting and the rib post.

9. The aircraft wing of claim 1, further including a terminal fitting, the rear spar and the side-of-body rib coupled via the terminal fitting.

10. The aircraft wing of claim 9, wherein the terminal fitting is disposed between a rear web of the side-of-body fitting and the rear spar, and wherein at least one of the first plurality of fasteners extends through the drag brace fitting, the rear spar, the terminal fitting, and the rear web of the side-of-body fitting.

11. The aircraft wing of claim 9, wherein a first portion of the intercostal member is separated from the rear spar by the terminal fitting, and a second portion of the intercostal member is in contact with the rear spar.

12. The aircraft wing of claim 1, wherein the rear spar is constructed of carbon fiber reinforced plastic.

13. A method comprising:
    disposing a drag brace fitting of a main landing gear on a rear side of a rear spar in a wing of an aircraft;
    coupling a side-of-body rib to the rear spar;
    coupling a side-of-body fitting to the side-of-body rib;
    disposing a rib post on a front side of the rear spar;
    coupling a second rib to the rib post;
    disposing an intercostal member on the front side of the rear spar, the intercostal member disposed between the side-of-body fitting and the rib post;
    coupling the intercostal member to the side-of-body fitting and the rib post; and
    coupling the drag brace fitting, via a first plurality of fasteners, to the rib post, the side-of-body fitting, and the intercostal member.

14. The method of claim 13, wherein coupling the side-of-body fitting to the side-of-body rib includes coupling the side-of-body fitting to the side-of-body rib via a second plurality of fasteners.

15. The method of claim 13, wherein coupling the intercostal member to the side-of-body fitting and the rib post includes coupling the intercostal member to the side-of-body fitting via a second plurality of fasteners and coupling the intercostal member to the rib post via a third plurality of fasteners.

16. An aircraft wing comprising:
a rear spar having a rear side and a front side opposite the rear side;
a side-of-body rib coupled to the rear spar;
a rib post disposed on the front side of the rear spar, the rib post to couple a second rib to the rear spar;
a fitting coupled to the side-of-body rib and the rib post; and
a drag brace fitting disposed on the rear side of the rear spar, the drag brace fitting coupled to the rib post and the fitting via a plurality of fasteners extending through the rear spar.

17. The aircraft wing of claim 16, wherein the fitting is in contact with the side-of-body rib and the rib post.

18. The aircraft wing of claim 17, wherein the fitting is in contact with the rear spar.

19. The method of claim 13, wherein coupling the side-of-body rib to the rear spar includes coupling the side-of-body rib to the rear spar via a terminal fitting such that the terminal fitting is disposed between a rear web of the side-of-body fitting and the rear spar.

20. The method of claim 19, wherein at least one of the first plurality of fasteners extends through the drag brace fitting, the rear spar, the terminal fitting, and the rear web of the side-of-body fitting.

\* \* \* \* \*